United States Patent
Tada et al.

(10) Patent No.: US 7,688,550 B2
(45) Date of Patent: Mar. 30, 2010

(54) HEAD SUSPENSION

(75) Inventors: Hajime Tada, Aikoh-gun (JP); Masao Hanya, Aikoh-gun (JP); Kenichi Takikawa, Aikoh-gun (JP); Eiji Watadani, Aikoh-gun (JP)

(73) Assignee: NHK Spring Co., Ltd., Yokohama (JP)

( * ) Notice: Subject to any disclaimer, the term of this patent is extended or adjusted under 35 U.S.C. 154(b) by 716 days.

(21) Appl. No.: 11/430,088

(22) Filed: May 8, 2006

(65) Prior Publication Data

US 2006/0250725 A1    Nov. 9, 2006

(30) Foreign Application Priority Data

May 9, 2005    (JP) .............................. 2005-136543

(51) Int. Cl.
*G11B 21/16* (2006.01)
(52) U.S. Cl. ............... 360/244.9; 360/244.8; 360/245.2
(58) Field of Classification Search ............. 360/244.9, 360/244.2, 244.3, 245.5
See application file for complete search history.

(56) References Cited

U.S. PATENT DOCUMENTS

| | | | | |
|---|---|---|---|---|
| 5,027,240 A | * | 6/1991 | Zarouri et al. ........... | 360/244.2 |
| 5,282,103 A | | 1/1994 | Hatch et al. | |
| 5,870,252 A | | 2/1999 | Hanrahan | |
| 6,104,572 A | | 8/2000 | Williams et al. | |
| 6,147,839 A | * | 11/2000 | Girard ..................... | 360/244.8 |
| 6,154,344 A | | 11/2000 | Marek | |
| 6,381,099 B1 | * | 4/2002 | Mei ......................... | 360/244.3 |
| 6,392,843 B1 | | 5/2002 | Murphy | |
| 6,728,072 B1 | | 4/2004 | Van Sloun et al. | |
| 6,741,424 B1 | * | 5/2004 | Danielson et al. ........ | 360/244.9 |
| 6,765,759 B2 | * | 7/2004 | Bhattacharya et al. ... | 360/244.2 |
| 7,099,116 B1 | * | 8/2006 | Mei ......................... | 360/244.8 |
| 7,283,332 B2 | | 10/2007 | Weber | |
| 2001/0043443 A1 | | 11/2001 | Okamoto et al. | |
| 2004/0120076 A1 | * | 6/2004 | Takagi et al. ............. | 360/244.2 |
| 2006/0260118 A1 | | 11/2006 | Takikawa et al. | |
| 2006/0260119 A1 | | 11/2006 | Tada et al. | |

FOREIGN PATENT DOCUMENTS

| | | |
|---|---|---|
| JP | 9-282624 | 10/1997 |
| JP | 10-031873 | 2/1998 |
| JP | 2004-079153 | 3/2004 |

\* cited by examiner

*Primary Examiner*—Craig A Renner
*Assistant Examiner*—Tamara Ashford
(74) *Attorney, Agent, or Firm*—Jordan and Hamburg LLP

(57) ABSTRACT

A head suspension for a hard disk drive includes a base to be attached to a carriage of the head disk drive and turned around a spindle. A load beam includes a rigid part and a resilient part separated from the rigid part, to apply load onto a head that is arranged at a front end of the load beam to write and read data to and from a disk arranged in the hard disk drive. A base end of the rigid part is connected to the resilient part that is supported with the base. A flexure has read/write wiring patterns connected to the head, the flexure supporting the head and attached to the load beam. A joint is provided on the rigid part, to be connected to the resilient part. A protrusion formed on each side edge. Reinforcing part each expands and connects between each of the protrusions and the rigid part.

31 Claims, 18 Drawing Sheets

|  | Example 1 | Comparative Example 1 | Comparative Example 2 |
|---|---|---|---|
| B1 [kHz] | 5.99 | 6.08 | 5.61 |
| T1 [kHz] | 9.09 | 9.18 | 7.76 |
| Sway [kHz] | 14.54 | 12.27 | 14.89 |
| STA [deg] | 2.31 *10-5 | 1.53 *10-5 | 3.23 *10-5 |
| Sway Stif. [N/m] | 19920.21 | 14502.67 | 19997.62 |
| G Lift off [G/gf] | 302.38 | 311.86 | 246.19 |

| LB Thickness [um] | 20 | 25 | 30 | 38 | 51 |
|---|---|---|---|---|---|
| B1 [kHz] | 5.27 | 5.53 | 5.74 | 5.99 | 6.16 |
| T1 [kHz] | 7.52 | 7.94 | 8.42 | 9.09 | 9.93 |
| Sway [kHz] | 11.61 | 12.40 | 13.76 | 14.54 | 15.00 |
| STA [deg] | 4.78 *10-5 | 3.88 *10-5 | 3.11 *10-5 | 2.31 *10-5 | 1.67 *10-5 |
| Sway Stif. [N/m] | 11312.98 | 14125.45 | 15838.22 | 19920.21 | 22997.85 |
| G Lift off [G/gf] | 374.66 | 353.03 | 330.59 | 302.38 | 280.44 | t38um to t51um LB is Proper for 2.5" HDD.

HEAD SUSPENSION

BACKGROUND OF THE INVENTION

1. Field of the Invention

The present invention relates to a head suspension for a hard disk drive incorporated into an information or data processing apparatus such as a computer.

2. Description of the Related Art

For example, there is a conventional head suspension such as shown in FIG. 37. FIG. 37 is a plan view showing a head suspension 101 incorporated into a hard disk drive. The head suspension 101 includes a base 103, a load beam 105, and a flexure 107. The load beam 105 includes a rigid part 109 and a resilient part 111. Rails 113 are formed along the side edges in an across-the-width direction of the rigid part 109 by rising from the rigid part 109.

FIG. 38 is a partly sectioned view partly showing an example of a hard disk drive in which the head suspensions 101 are arranged. As shown in FIG. 38, the hard disk drive has a carriage 115 including arms 117. Each head suspension 101 is attached to the arm 117 of the carriage 115 via the base 103 by swaging or the like.

The carriage 115 is turned around a spindle 121 by a positioning motor 119 such as a voice coil motor or the like. By turning the carriage 115 around the spindle 121, a head 123 of the head suspension 101 is moved to a target track on a disk 125 arranged in the hard disk drive.

When the disk 125 is rotated at high speed, the head 123 slightly floats from the surface of the disk 125 against a gram load that is a load applied to the head 123 by the head suspension 101.

In recent years, application of the hard disk drives increasingly expands to a small-sized personal computer for a mobile machine or a portable (cellular) phone so that the hard disk drives are used under more severe conditions. Importance of measures to shock applied or input to the hard disk drive gradually increases.

The head suspension has a shock property that determines a lift of the slider from the surface of the hard disk when a shock is applied or input. The shock property of the head suspension is dependent on the weight of the load beam.

For example, a first head suspension has a load beam having a thickness (t) of 51 μm, a length (IL) of 7 mm, and a gram load of 2.5 gf that is applied by the load beam to a head, and a second head suspension has a load beam having a thickness (t) of 30 μm, a length (IL) of 5.5 mm, and a gram load of 2.5 gf. If a shock of 1 msec duration (1 msec in half wavelength) is applied to these head suspensions, a slider of the first head suspension lifts at an acceleration of 628 G and a slider of the second head suspension lifts at an acceleration of 1103 G.

It is understood from these examples that, to improve the shock property of a head suspension, a load beam of the head suspension must be thin and short and must have a large gram load.

Therefore, measures such as reduction of the thickness of a load beam are adopted in a head suspension for a miniaturized hard disk drive such as a 2.5-inch hard disk drive whose shock property is required to be improved.

However, a head suspension having a thin load beam sways or flutters due to air disturbance as external influence at a first torsion frequency, i.e., a resonant frequency in a first torsion mode. The sway or flutter of the head suspension at the first torsion mode is hereinafter referred to as "T1 windage" and the first torsion frequency is hereinafter is referred to as "T1 frequency." The "T1 windage" is also indicative of the property of the sway or flutter of the head suspension. The T1 windage results in limit in improvement of positioning accuracy of the head suspension to a track.

On the other hand, the number of tracks per one inch tends to be gradually increased due to increase of a recording density of a hard disk. As this result, a track pitch becomes narrow and an allowable range of a positional deviation of the head to a track becomes further narrow. Therefore, further improvement of the positioning accuracy of the head suspension is required. The positional deviation of the head is hereinafter referred to as "off-track."

In this way, improvements of the shock property and the T1 windage are in a trade-off relationship, but simultaneous pursuit of the both is a factor in the miniaturization of the hard disk drive.

At present, the off-track of the head is controlled by suppressing frequency with a control system. However, the control system suppresses the frequency in a range of about 0.8 to 1.3 kHz only. Therefore, the frequency excepting the range due to air disturbance can not be suppressed securely. A property of the control system almost depends on a main torsion mode of a carriage of a head suspension. Resonant frequencies in the main torsion mode are about 5 kHz in a 3.5-inch hard disk drive and about 6 kHz in a 2.5-inch hard disk drive. Accordingly, when the head suspension has T1 frequency and sway frequency which are lower than the resonant frequencies in the main torsion mode, stability of the control system may be adversely affected.

A resonant frequency in a first bending mode of the head suspension may affect stability of the control system related to the main mode of the carriage or the like. The resonant frequency in the first bending mode is hereinafter referred to as "B1 frequency." Further, when the B1 frequency is low, the shock property also degrades. For the details of the above-mentioned related arts, Japanese Unexamined Patent Application Publication No. 09-282624 and U.S. Pat. No. 6,765,759B2.

SUMMARY OF THE INVENTION

An object of the present invention is to provide a head suspension, capable of simultaneously improving a shock property and T1 windage by raising T1 frequency and sway frequency.

In order to accomplish the object, the present invention is most characterized by reinforcing parts expanded between a protrusion formed on each side edge of a joint provided with a rigid part and the rigid part.

An aspect of the present invention provides a head suspension having a load beam which includes a rigid part and a resilient part separated from the rigid part. The rigid part has a body and a joint that is attached to the resilient part. The joint has a protrusion on each side edge. Between each protrusion and the rigid part, a reinforcing part is expanded to connect the protrusion and the rigid part.

According to this aspect of the present invention, the head suspension allows to reduce the weight of the rigid part to improve the shock property. At the same time, the head suspension can increase the rigidity of the load beam in the swaying direction to raise the T1 frequency and the sway frequency, so that it can improve T1 windage.

DETAILED DESCRIPTION OF EMBODIMENTS

Head suspensions according to embodiments of the present invention will be explained in detail. Each of the embodiments provides an area between each protrusion of a joint and a rigid part with a reinforcing part connecting the protrusion and the rigid part, to realize to simultaneously improve T1 windage and shock property.

First Embodiment

A structure of the head suspension will be explained with reference to FIGS. 1 and 2.

Figure 1:
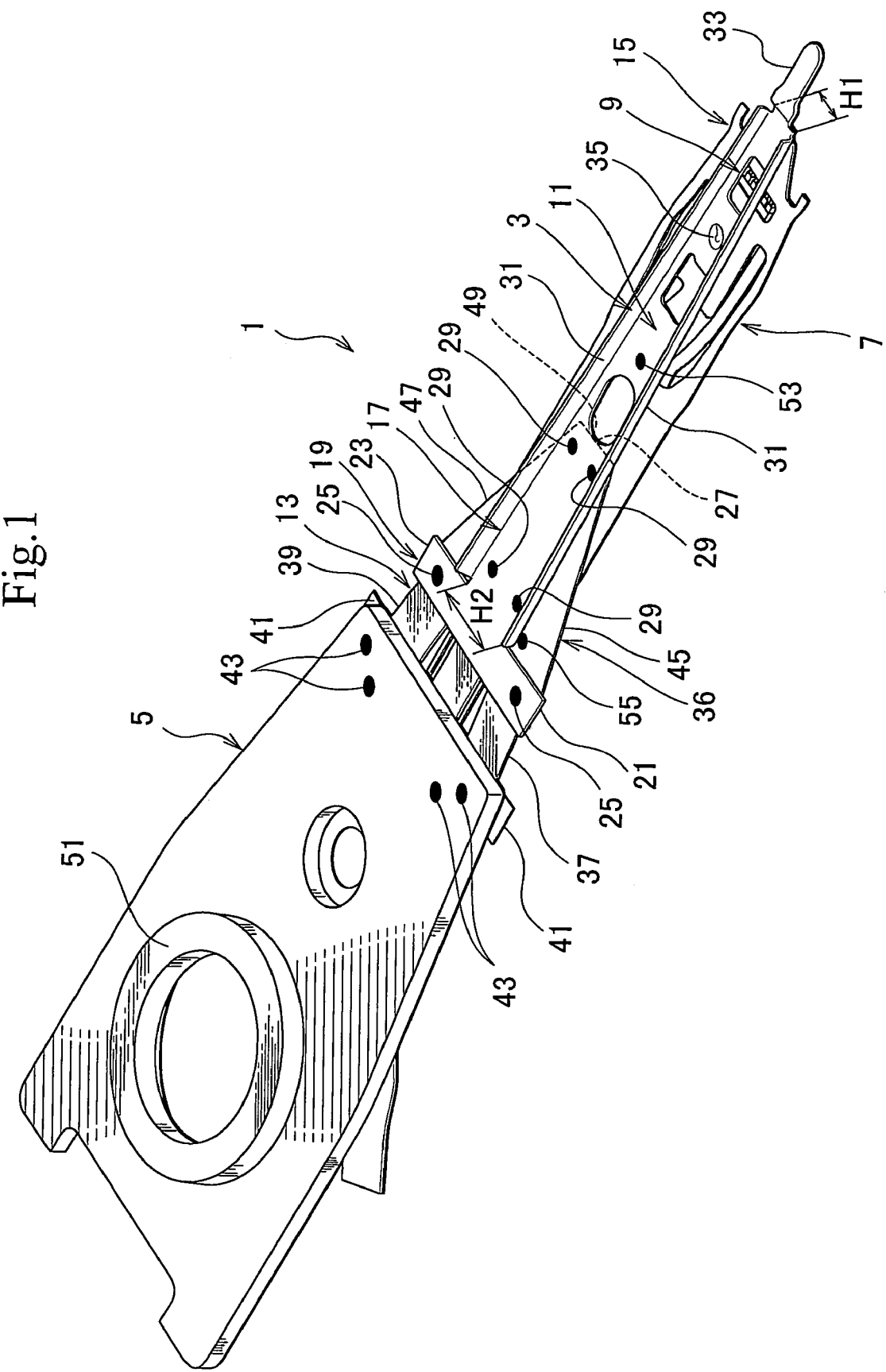
FIG. 1 is a perspective view showing a head suspension according to a first embodiment of the present invention on an opposite-to-disk side.
Figure 2:
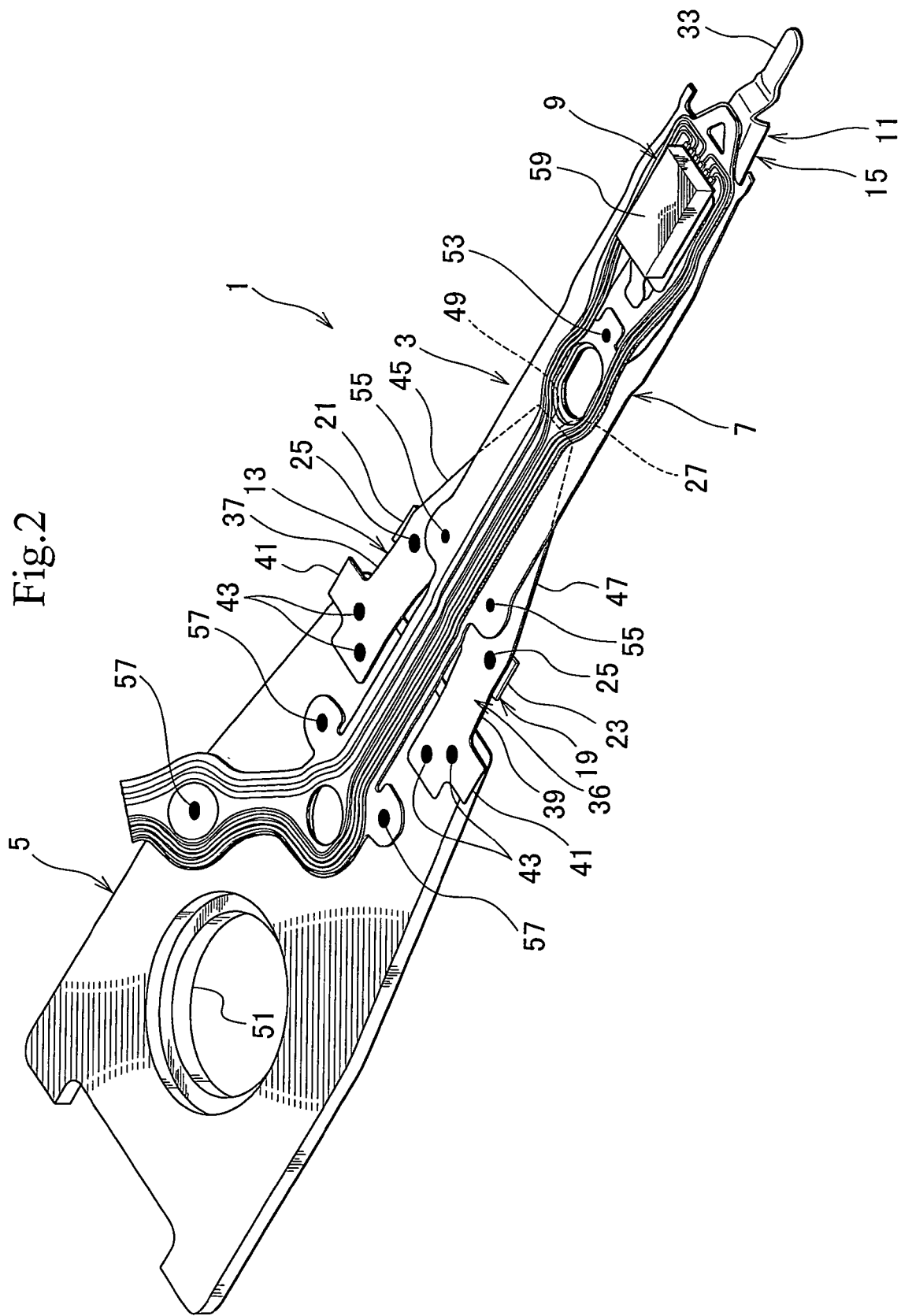
FIG. 2 is a perspective view showing the head suspension of FIG. 1 on a disk side.

FIG. 1 is a perspective view showing a head suspension according to a first embodiment of the present invention on an opposite-to-disk side, and FIG. 2 is a perspective view of the head suspension of FIG. 1 on a disk side. In this specification, the "disk" is a storage medium which is arranged in a hard disk drive and to and from which data is written and read through a head supported by the head suspension. The opposite-to-disk side is one side of the head suspension 1 that is oriented opposite to the disk. On the other hand, disk side is other side of the head suspension 1 facing the disk.

Shock property of the load beam is expressed with the magnitude of a shock at which the slider of the load beam is lifted from the surface of a disk. The phenomenon that a slider of a load beam lifts off from the surface of a disk in response to the application of a shock is referred to as "G-lift-off." The "G-lift-off" is also indicative of the magnitude of the shock that causes a lift-off of the slider.

As shown in FIGS. 1 and 2, the head suspension 1 includes a load beam (LB) 3, a base plate 5 corresponding to a base, and a flexure 7. The head suspension 1 shown in FIGS. 1 and 2 is used for, for example, a 2.5-inch hard disk drive.

The load beam 3 applies a gram load that is a load onto a head 9. The head 9 is arranged at a front end of the load beam 3, to write and read data to and from the disk. The load beam 3 includes a rigid part (flange portion or beam) 11 and a resilient part (hinge or hinge portion) 13.

The rigid part 11 is made of, for example, a thin stainless steel plate. The rigid part 11 is extended from a front end 15 to a base end 17. The rigid part 11 has a body which gradually becomes narrow from the base end 17 toward the front end 15. The body of the rigid part has a wholly narrow shape narrower than the resilient part 13. In the first embodiment, the rigid part 11 is set such that a width H1 of the front end 15 is 0.4 mm and a width H2 of a base end 17 is 0.96 mm.

The rigid part 11 is integrally provided with a joint 19 at the base end 17. On both sides of the joint 19 in an across-the-width direction of the load beam 3, protrusions 21 and 23 are formed. The protrusions 21 and 23 protrude from both sides of the rigid part 11 in the across-the-width direction. Therefore, the rigid part 11 including the joint 19 is formed in a T shape wholly.

The joint 19 of the rigid part 11 overlaps a first end of the resilient part 13, to be fixed and supported to the resilient part at two welded spots 25 by laser welding or the like. The vicinity of the base end 17 of the rigid part 11 also overlaps an extension 27 of the resilient part 13 described later, to be fixed and supported to the extension 27 at total four welded spots 29 of two welded spots relatively located at a front side and two welded spot relatively located at a rear side in an extending (longitudinal) direction of the load beam 3. The number of welded spots 25 or 29 is not limited to the specific number, and the number may be selected optionally.

The rigid part 11 has rails 31 formed along both side edges of the body thereof in the across-the-width direction. The rails 11 and 13 are raised from the body in a thickness direction of the rigid part 11 by box-bending adjacent portions adjacent to the body of the rigid part 11. Each rail 31 is extended from the front end 15 to the base end 17 just before the joint 19 of the rigid part 11 through a portion of the resilient part 13 arranged on the extension 27. Namely, the rail 31 is extended over an approximately entire length of the rigid part 11. The rail 31 has the same thickness as the body of the rigid part 11. The thickness of the whole area or a part of the rail 31 may formed to be thinner than that of the body of the rigid part 11 by partial etching or the like.

The rigid part 11 has a tab 33 for loading and unloading at the front end 15 thereof and a dimple 35 in the vicinity of the front end 15.

The resilient part 13 comprises a resilient member 36 separated from the rigid part 11. The resilient member 36 is made of, for example, a thin stainless rolled plate having a spring or resilient property. The resilient member 36 has bifurcated branches 37 and 39 extending toward the base plate 5 on a second end. The branches 37 and 39 are continuously integrated with each other on the joint 19. Each of branches 37 and 39 has a cut part 41 remaining on an outer side edge in the across-the-width direction. The cut part 41 is cut along it when a sheet material is cut into a plurality of resilient members 36. Each of ends of the branches 37 and 39 of the resilient member 36 overlaps on an end of the base plate 5 to be fixed and supported to the base plate 5 at two welded spots 43 by laser welding or the like.

The resilient member 36 has the extension 27 on the first end. The extension 27 is extended, toward the front end 15 of the rigid part 11, from a portion arranged on the joint 19 to a portion arranged on the vicinity of the base end 17 of the rigid part 11. The extension 27 has a length which is about ⅓ of the length of the rigid part 11 in this embodiment. The length of the extension 27 may be set in a range of ¼ to ½ of the length of the rigid part 11.

The resilient member 36 has reinforcing parts 45 and 47 on both sides of the extension 27 in the across-the-width direction, respectively. The each reinforcing part is expanded between the each protrusion of the joint 19 to the front end 49 of the extension 27. Therefore, the reinforcing parts 45 and 47 are expanded between both protrusions 21 and 23 of the joint 19 and the vicinity of the base end 17 of the rigid part 11, to connect or bridge the protrusions 21 and 23 and the rigid part 11. Each reinforcing part has a wing shape gradually expanding in the across-the-width direction of the load beam 3 from the rigid part 11 side toward the joint 19 side. According to the first embodiment, the wing shape of the reinforcing part is a triangular wing shape. The wing shape may be set in an arbitrary shape such as a trapezoidal shape capable of achieving a function as a reinforcing part. The reinforcing parts 45 and 47 serve as struts to reinforce a portion between both protrusions 21 and 23 of the joint 19 and the vicinity of the base end 17 of the rigid part 11 without adding a special member.

The base plate 5 includes a boss 51 to be attached to an arm supported to the carriage via the boss 51 by swaging or the like. Accordingly, the base plate 5 can be turned around a spindle of the carriage. The base plate 5 may be formed integrally at a front end of an arm to be supported to the carriage.

The flexure 7 is a thin electrically conductive plate such as a thin stainless steel rolled plate (SST) having a spring or resilient property. The flexure 7 has an insulating layer formed on the thin plate. On the insulating layer, read/write wiring patterns are formed. The flexure 7 is extended from the front end 15 of the rigid part 11 toward the base plate 5. The flexure 7 is fixed to the rigid part 11 at a welded spot 53 by laser welding or the like, it is fixed to the resilient member 36 at welded spots 55 by similar laser welding, and it is also fixed to the base plate 5 at welded spot 57 by similar laser welding. One end of the flexure wiring patterns are electrically connected to write and read terminals supported on the slider 59 of the head 9.

Operations and advantages of the first embodiment will be explained.

Figure 38:
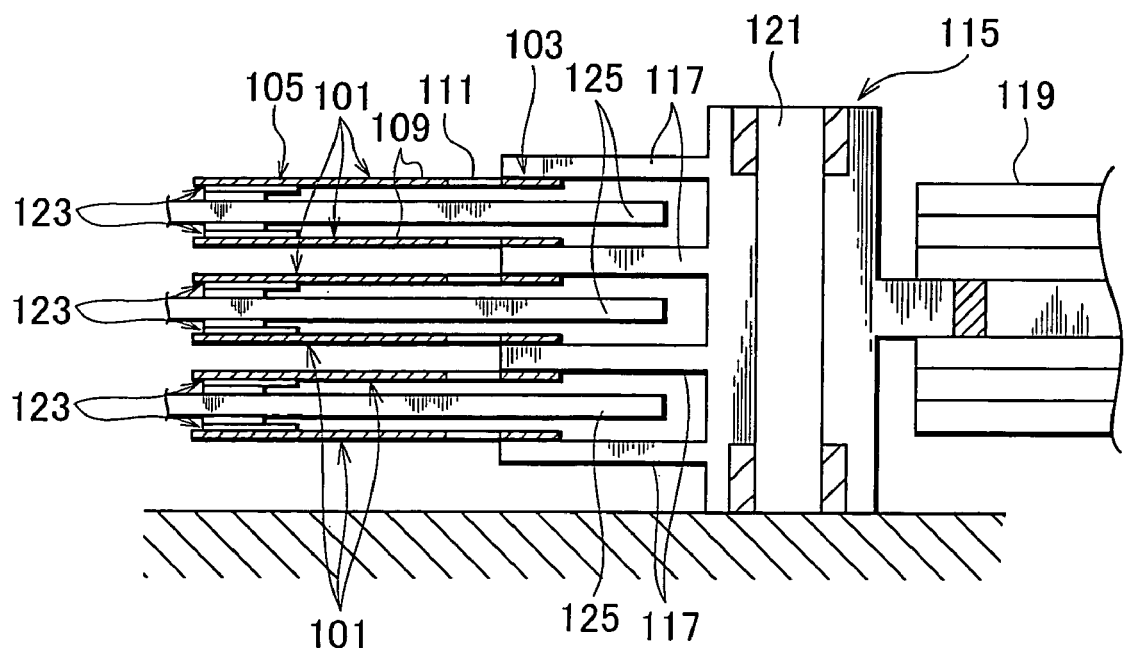
FIG. 38 is a partly sectioned view partly showing an example of a hard disk drive in which the head suspensions of FIG. 37 are arranged.

According to the first embodiment, the head suspension 1 is attached to the carriage for a plurality of disks in a similar manner as the case shown in FIG. 38. The head suspension 1 may be attached for one disk.

When the disk rotates at high speed, the head 9 of the head suspension 1 slightly floats from the surface of the disk against the gram load. The head 9 is moved to a target track on the disk by pivoting of the arm of the carriage.

According to the first embodiment, the head suspension 1 includes the rigid part 11 and the resilient part 13 comprising the resilient member 36 separated from the rigid part 11. The joint 19 is provided on the base end of the rigid part 11 and is fixed and supported to the resilient member 36. The joint 19 has the protrusions 21 and 23 which protrude from both the sides of the rigid part 11 in the across-the-width direction. The reinforcing parts 45 and 47 are arranged between the protrusions 21 and 23 of the joint 19 and the vicinity of the rigid part 11, to connect or bridge both the protrusions 21 and 23 of the joint 19 and the vicinity of the base end 17 of the rigid part 11. Therefore, the head suspension 1 enables to increase the rigidity of the load beam 3 in the sway direction to raise the sway frequency while increasing G-lift-off to improve the shock property using the narrow rigid part 11.

The rails 31 are formed on the both side edges of the rigid part 11 in the across-the-width direction to extend from the front end 15 of the rigid part 11 to a portion just before the joint 19 of the rigid part 11 through the portion of the resilient part 13 located on the extension 27. Namely, the rail 31 is expanded over an approximately entire length of the rigid part 11. The structure can secure longitudinal rigidity of the rigid part 11 while the rigid part 11 is reduced in thickness and weight, so that high T1 frequency and a high B1 frequency can be obtained.

Thereby, the T1 windage can be improved without degrading other properties.

According to the first embodiment, the reinforcing parts 45 and 47 are farmed in a triangular wing whose width gradually expands from the front end 15 side of the rigid part 11 toward the joint 19. Therefore, the reinforcing parts 45 and 47 serve as struts and reinforce a portion of the rigid part 11 positioned between the protrusions 21 and 23 of the joint 19 and the vicinity of the base end 17 of the rigid part 11 without adding a special member.

Since the extension 27 is set in a range of ¼ to ½ of the length of the rigid part 11, in the first embodiment, about ⅓, weight reduction of the load beam 3 can be reliably achieved while the rigid part 11 is reinforced by the resilient member 36.

Grounds for simultaneous pursuit of shock property and T1 windage or the like will be explained with reference to FIGS. 3 to 32.

As described above, in the head suspension, when the load beam is made thin in order to improve the shock property, the problematic swaying or fluttering of the head suspension occurs due to air disturbance.

The T1 windage which is swaying or fluttering of a head suspension due to air disturbance will be explained.

Figure 3:
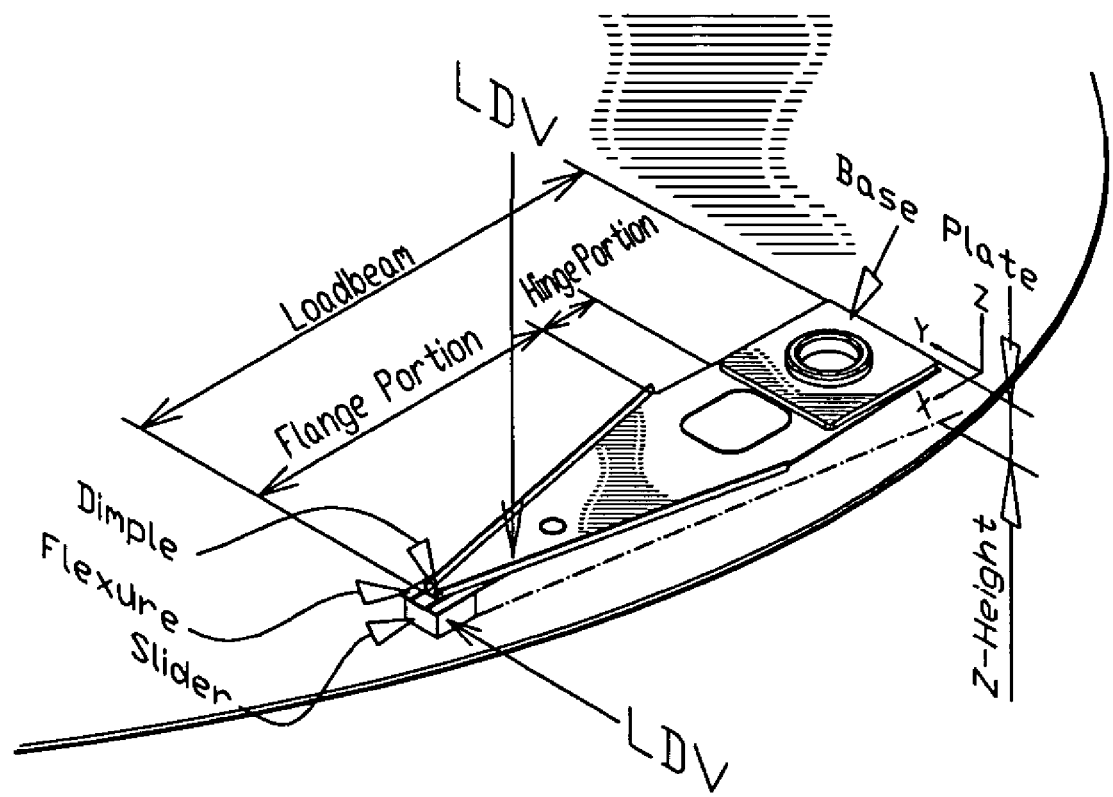
FIG. 3 is a schematic perspective view showing a method for measuring T1 windage.

FIG. 3 is a schematic perspective view showing a method for measuring T1 windage. As shown in FIG. 3, a track direction displacement (windage) of a slider and a load beam amplitude are measured using a laser doppler velocimeter (LDV in FIG. 3) and a fast fourier transform (FFT) analyzer. In the specification, "Z-height" is indicative of a height of a head from a base of a head suspension assembled in a hard disk drive in a Z direction (vertical direction).

In general, a hard disk drive allows a position error within ±5% of a track pitch, and does not allow a position error exceeding the range for reliable reading and writing data. For example, in case of applying disks each having 100 kTPI of the number of tracks per one inch to a hard disk drive, the track pitch is 254 nm, and the position error must be suppressed within ±12.7 nm which is 5% of the track pitch.

Swaying or fluttering of such a head suspension suppressed by a control system is limited to a range of 0.8 to 1.3 kHz, and a high frequency region can not be suppressed.

Then, the swaying or fluttering of the head suspension at a disk revolution speed of 10000 rpm is several times that at a disk revolution speed of 5400 rpm. Therefore, how to suppress the swinging is a problem to be solved, which requires improvement of the head suspension itself.

Figure 4:
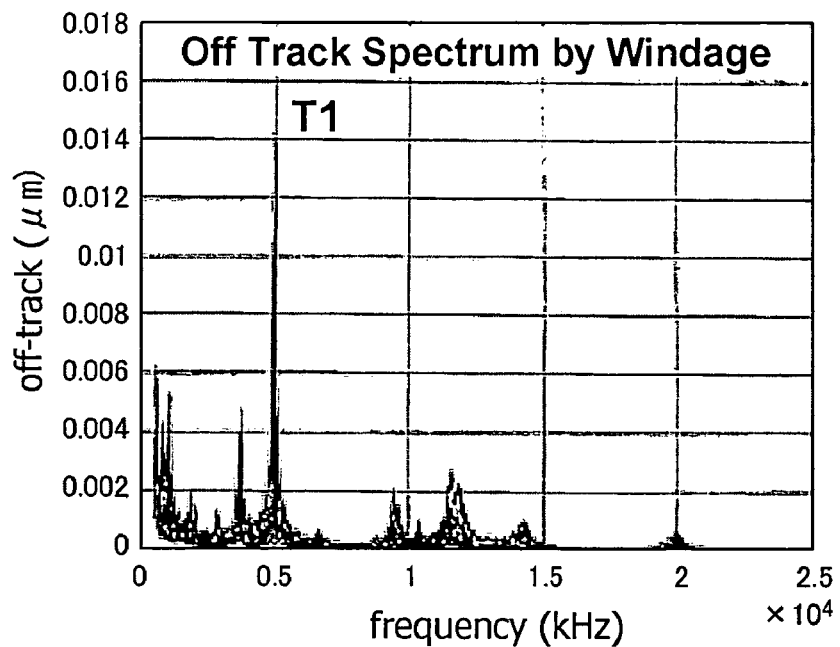
FIG. 4 is a graph showing a relationship between off-track of the head suspension and frequency.
Figure 5:
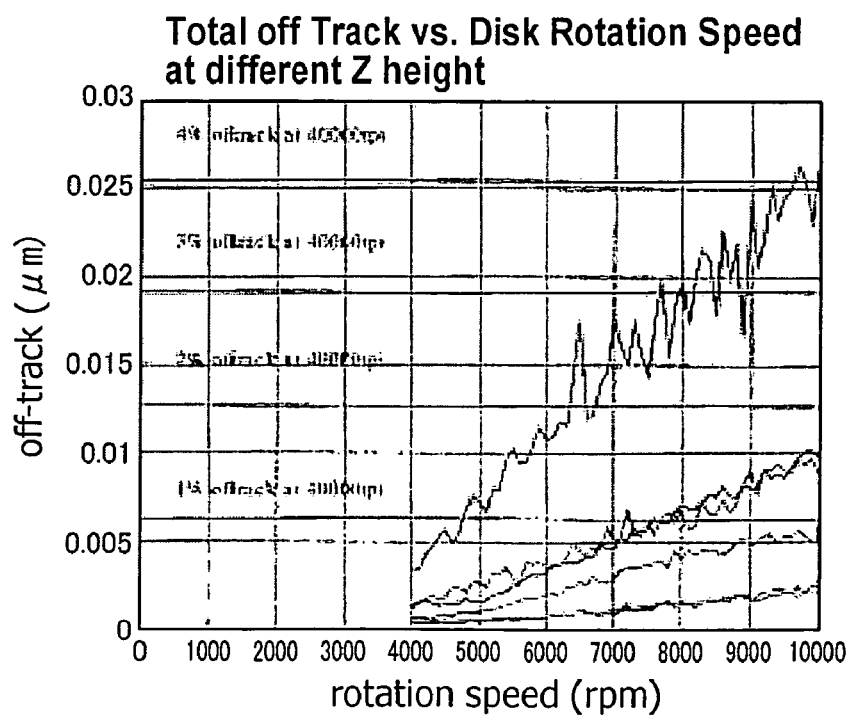
FIG. 5 is a graph showing a relationship between off-track of the head suspension and rotational speed of a disk.

FIG. 4 is a graph showing a relationship between off-track of the head suspension and frequency due to air disturbance, and FIG. 5 is a graph showing a relationship between total off-track of the head suspension and rotational speed of a disk. The graph of FIG. 5 is based on the result obtained by measuring off track to the disk revolution speed at several different Z-heights.

It is understood from FIG. 4 that the peak of T1 is large as compared with the others and it is a main factor of the off-track.

As is apparent in FIG. 5, the revolution speed of the disk of an abscissa becomes two times, for example changes from 5000 rpm to 10000 rpm or twice, the off-tack becomes four times. Thereby, when the revolution speed of the disk becomes twice, influence of the air disturbance shown in FIG. 4 also becomes four times.

Figure 6:
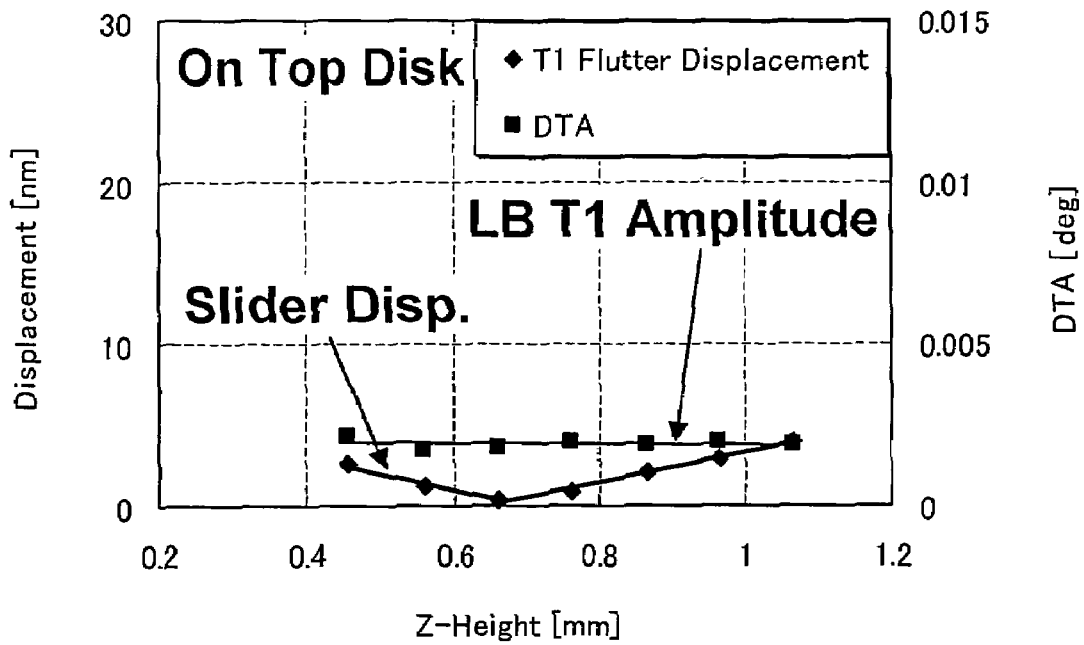
FIG. 6 is a graph showing a relationship between dynamic T1 angle (DTA) or T1 amplitude of a load beam and slider T1 displacement or T1 flutter displacement thereof in head suspensions having different Z-heights due to T1 windage on a top disk or one disk.
Figure 7:
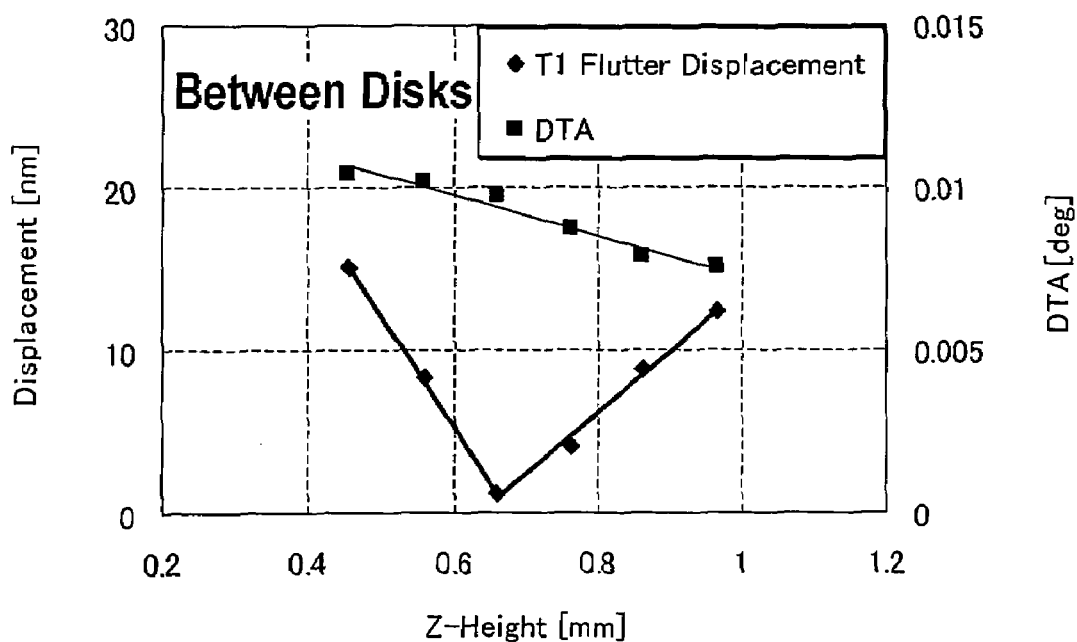
FIG. 7 is a graph showing a relationship between dynamic T1 angle (DTA) or T1 amplitude of a load beam and slider T1 displacement or T1 flutter displacement thereof in head suspensions having different Z-heights due to T1 windage between two disks.

FIGS. 6 and 7 are graphs each showing a relationship between the dynamic T1 angle (DTA) or T1 amplitude of a load beam and the slider T1 displacement or the T1 flutter displacement thereof in head suspensions having different the Z-heights due to the T1 windage. FIG. 6 shows the result of the head suspensions used for one disk, and FIG. 7 shows the result of the head suspensions arranged between two disks.

As is apparent in FIGS. 6 and 7, the DTA of the load beam and the lateral displacement of the slider between two disks become slightly larger than five times those in the case of one disk. Accordingly, the air disturbance between disks increases so that off-track of the slider reacts sensitively to the Z-height change.

In general, as winds swaying or fluttering a rigid body, there are various kinds of winds including Karman vortex and Buffeting flow as representative ones.

The Karman vortex is a burble at a specific frequency, while the Buffeting flow is a flow having nonsteady pressure fluctuation proportional to a square of a wind velocity. Accordingly, the buffeting flow relates to the swaying or fluttering of the head suspension of the hard disk drive, so that a structure is vibrated up to a very high frequency.

Therefore, against the buffeting flow, it is necessary to adopt measures for reducing wind velocity in a whole system and strengthen the head suspension as the structure to prevent swaying or fluttering even if pressure fluctuation occurs.

Next, in order to strengthen the head suspension as the structure, a static torsion angle (STA) is examined.

Figure 8:
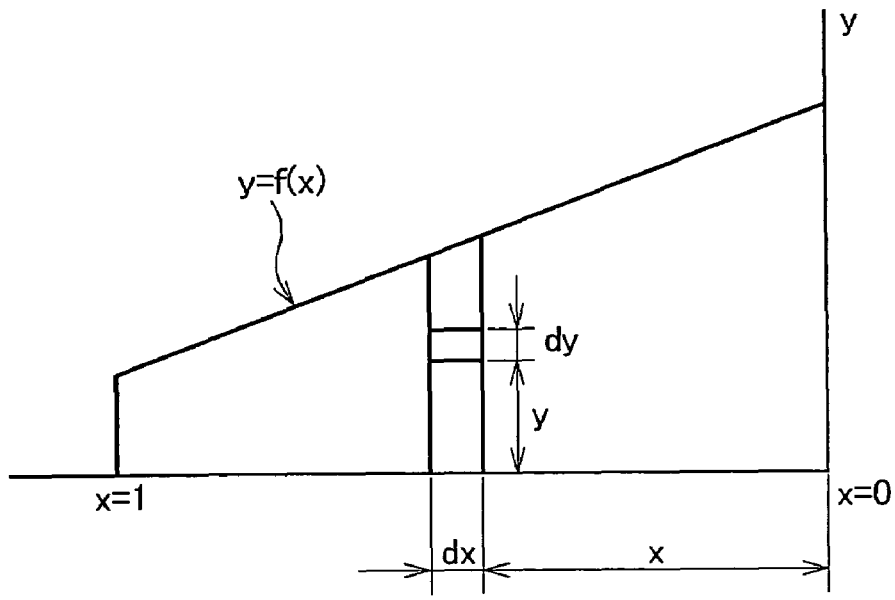
FIG. 8 is a graph showing a load beam shape function.
Figure 9:
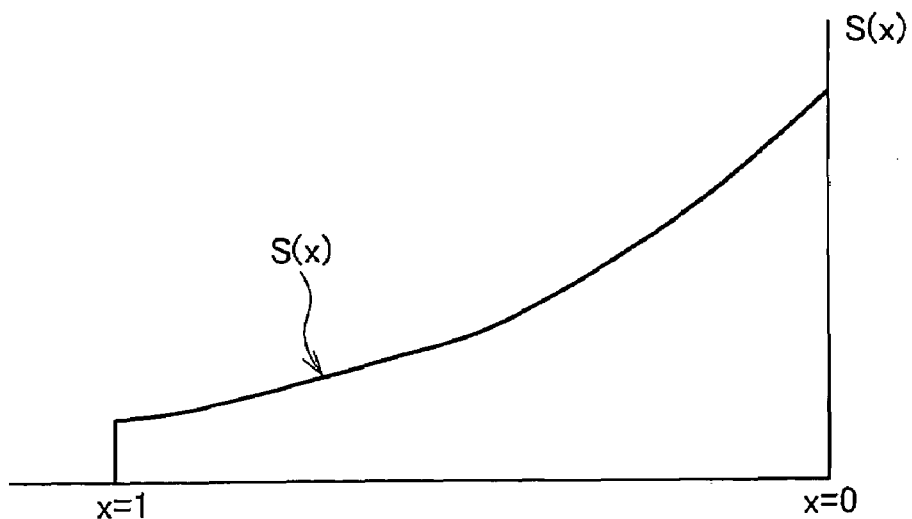
FIG. 9 is a graph showing load beam torsion rigidity.

FIG. 8 is a graph showing a load beam shape function, and FIG. 9 is a graph showing a load beam torsion rigidity.

In FIG. 8, a moment M(x) acting on one point x of a rigid part of a load beam is expressed as follows:

$$M(x) = \int_0^{f(x)} F(t) \cdot y \, dy \, dx \quad (1)$$

As shown in FIG. 9, torsion rigidity S(x) can be calculated as a function of x. Accordingly, a torsion angle θ at a dimple can be expressed as follows on the basis of the expression (1) and the S(x):

$$\theta = F(t) \int_0^1 \frac{\int_0^{f(x)} y \, dy}{S(x)} dx \quad (2)$$

Assuming nonsteady fluid force F(t)=1 (N/m²), the expression (2) is changed as follows:

$$\theta = \int_0^1 \frac{\int_0^{f(x)} y\,dy}{S(x)} dx \qquad (3)$$

That is, the STA is strength based on an angle θ at which the head suspension is twisted when fluid force which is always 1 is applied to a projection area of the head suspension. A torsion rigidity of a point on an area of a load beam to a moment is calculated. Therefore, when division is made as the expression (2), the torsion angle θ generated when a force is applied to the point can be obtained. When all the torsion angles are summed, a torsion angle θ obtained when static force is applied in a range from x=0 to the dimple can be obtained, so that the expression (3) is obtained as F(t)=1 (N/m$^2$), which is called "STA". When the STA is large, the head suspension is swayed or fluttered by applying a wind thereto, but when the STA is small, the head suspension is not so swayed or fluttered by applying the same wind thereto.

FIGS. 10 to 13 are graphs showing relationships between dynamic T1 angle (DTA) of a load beam and slider T1 displacement or T1 flutter displacement thereof, and a Z-height due to T1 windage to a head suspension having different static torsion angles (STA).

Figure 10:
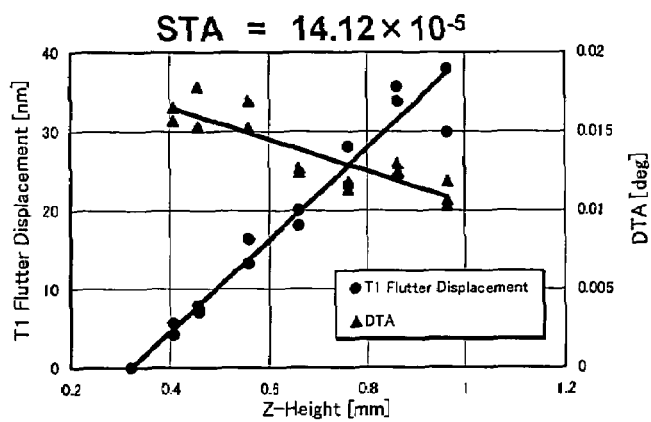
FIG. 10 is a graph showing a relationship between dynamic T1 angle (DTA) or T1 amplitude of a load beam or slider T1 displacement or T1 flutter displacement thereof, and Z-height due to T1 windage to a head suspension having one static torsion angle (STA)
Figure 11:
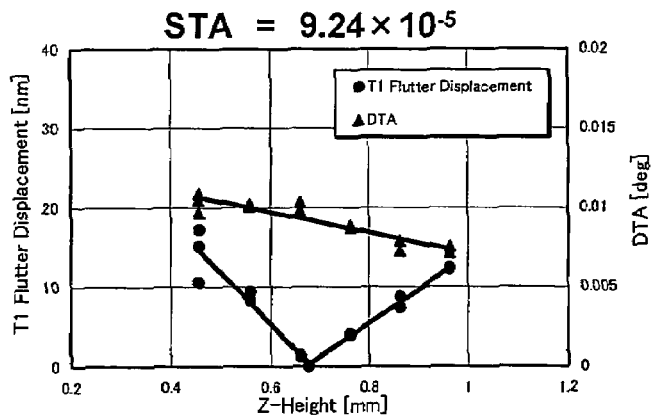
FIG. 11 is a graph showing a relationship between dynamic T1 angle (DTA) or T1 amplitude of a load beam or slider T1 displacement or T1 flutter displacement thereof, and Z-height due to T1 windage to a head suspension having another static torsion angle (STA)
Figure 12:
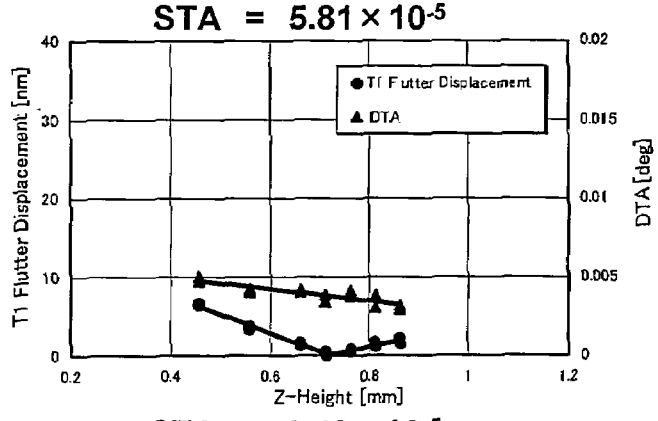
FIG. 12 is a graph showing a relationship between dynamic T1 angle (DTA) or T1 amplitude of a load beam or slider T1 displacement or T1 flutter displacement thereof, and Z-height due to T1 windage to a head suspension having still another static torsion angle (STA)
Figure 13:
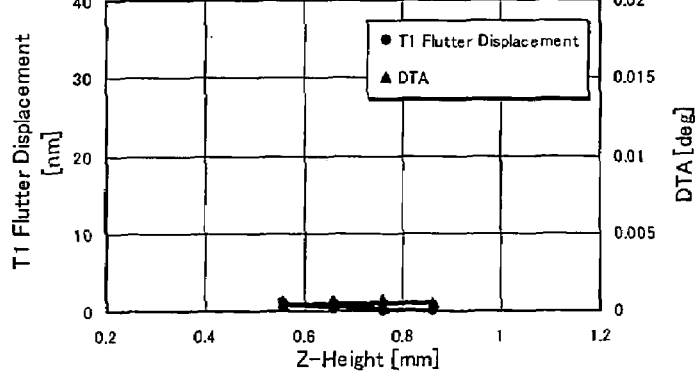
FIG. 13 is a graph showing a relationship between dynamic T1 angle (DTA) or T1 amplitude of a load beam or slider T1 displacement or T1 flutter displacement thereof, and Z-height due to T1 windage to a head suspension having still another static torsion angle (STA)

The graph shown in FIG. 10 corresponds to STA=14.12×10$^{-5}$, the graph shown in FIG. 11 corresponds to STA=9.24×10$^{-5}$, the graph shown in FIG. 12 corresponds to STA=5.81×10$^{-5}$, and the graph shown in FIG. 13 corresponds to STA=2.42×10$^{-5}$. In FIGS. 10 to 13, the plot △ corresponds to DTA of the load beam, and the plot • corresponds to T1 flutter displacement, namely, sensitivity of the off-track of the slider based on the Z-height. The sensitivity is represented with "T1 windage ZH sensitivity."

As is apparent in FIGS. 10 to 13, the DTA of the load beam becomes gradually small according to lowering of the STA. Thereby, the change of the T1 flutter displacement becomes flat.

Figure 14:
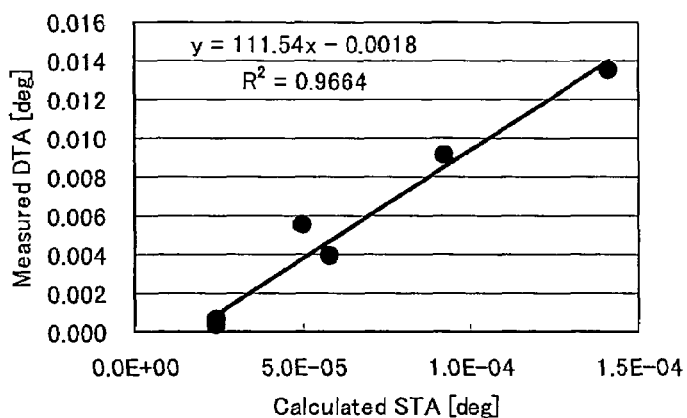
FIG. 14 is a graph showing a relationship between calculated STA and measured DTA.

While FIGS. 10 to 13 show the measured values, FIG. 14 is a graph showing a relationship between the calculated STA and the measured DTA.

As is apparent in FIG. 14, the calculated STA and the measured DTA are in proportional relationship, and a straight line showing the proportional relationship does not pass through 0. Namely, when the calculated STA is made small, an excellent head suspension against the T1 windage can be obtained.

Figure 15:
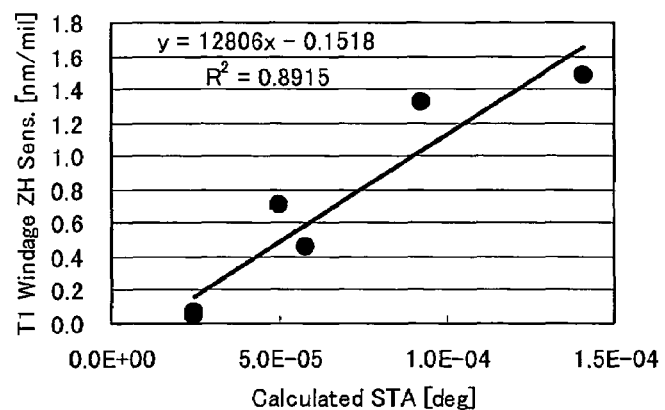
FIG. 15 is a graph showing a relationship between calculated STA and T1 windage ZH sensitivity.
Figure 16:
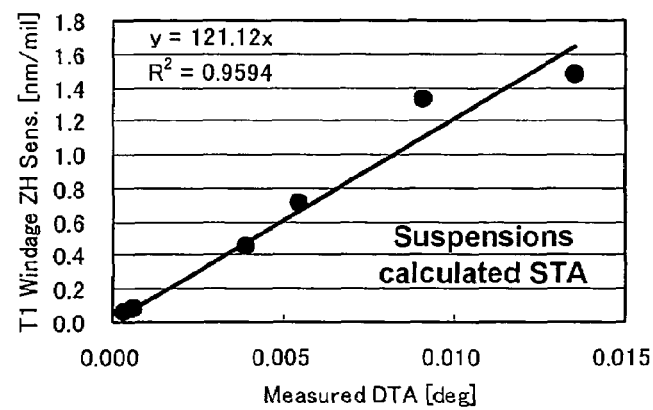
FIG. 16 is a graph showing a relationship between measured DTA and T1 windage ZH sensitivity.
Figure 17:
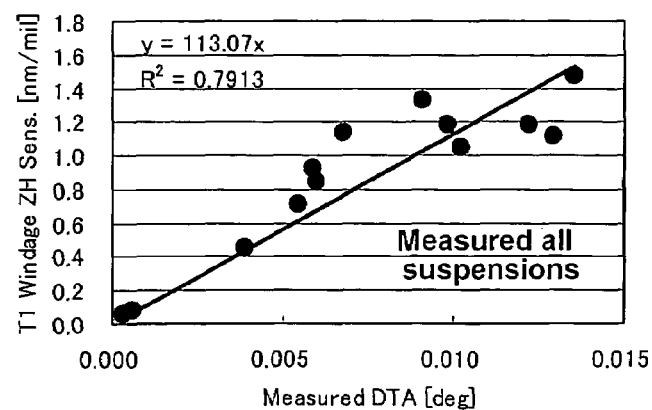
FIG. 17 is a graph showing a relationship between measured DTA and T1 windage ZH sensitivity plotted from the value regarding a plurality of head suspensions.

FIG. 15 is a graph showing a relationship between the calculated STA and the T1 windage ZH sensitivity, FIG. 16 shows a graph showing relationship between the measured DTA and the T1 windage ZH sensitivity, and FIG. 17 is a graph showing a relationship between the measured DTA and the T1 windage ZH sensitivity plotted from the value regarding a plurality of head suspensions.

FIGS. 15 to 17 show such a fact that the measured DTA and the T1 windage ZH sensitivity is in a proportional relationships, from which it is apparent that the STA is desirable to be reduced relative to the T1 windage. The T1 windage ZH sensitivity is as plotted as mark • in FIGS. 10 to 13, and reduction of the STA means that a broken line representing the T1 windage ZH sensitivity becomes flat.

In fact, a movement of the head suspension is dynamic, so that it is considered that the swaying or fluttering of the head suspension is influenced by inertia. In calculation for the STA, the inertia is not considered. Accordingly, it is necessary to make consideration including the inertia in fact. Therefore, FIGS. 18 to 21 show graphs based on frequency.

Figure 18:
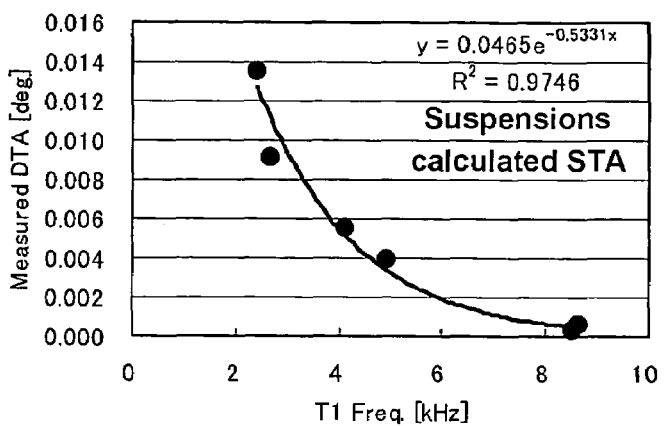
FIG. 18 is a graph showing a relationship between T1 frequency and measured DTA.
Figure 19:
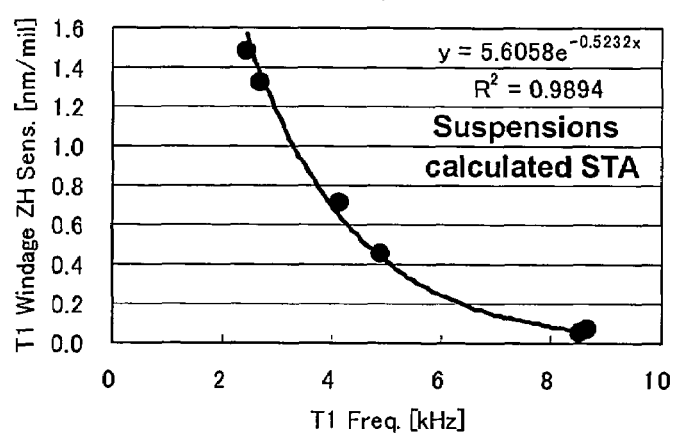
FIG. 19 is a graph showing a relationship between T1 frequency and T1 windage ZH sensitivity.
Figure 20:
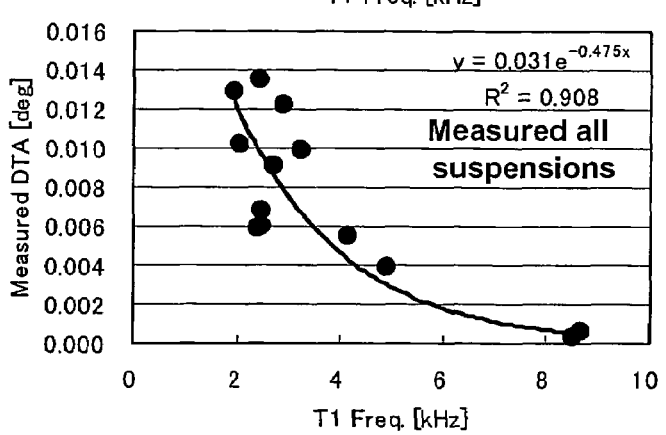
FIG. 20 is a graph showing a relationship between T1 frequency and measured DTA plotted from the value regarding a plurality of head suspensions.
Figure 21:
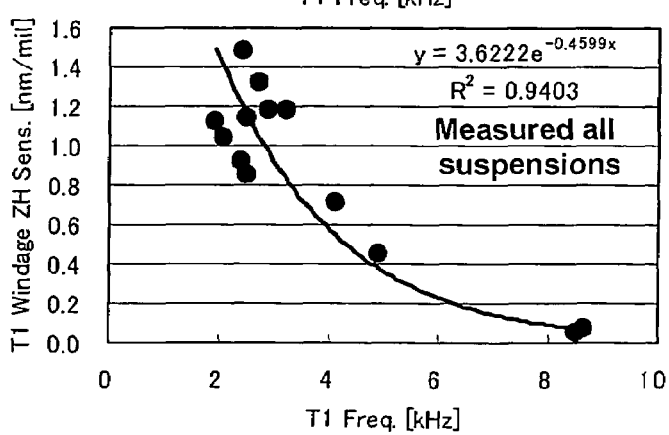
FIG. 21 is a graph showing a relationship between T1 frequency and T1 windage ZH sensitivity plotted from the value regarding a plurality of head suspensions.

FIG. 18 is a graph showing a relationship between the T1 frequency and measured DTA, FIG. 19 is a graph showing a relationship between the T1 frequency and the T1 windage ZH sensitivity, FIG. 20 is a graph showing a relationship between the T1 frequency and the measured DTA plotted regarding a plurality of head suspension, and FIG. 21 is a graph showing a relationship between the T1 frequency and the T1 windage ZH sensitivity plotted from the value regarding a plurality of head suspension.

As apparent from FIGS. 18 to 21, both the measured DTA and the T1 windage ZH sensitivity become small in a quadric manner according to increase in the T1 frequency.

In other words, a fact that the T1 frequency is high means that torsion rigidity is high and the inertia is light. Therefore, both the measured DTA and the T1 windage ZH sensitivity become small in a quadric manner, as described above. However, when the measurement was performed regarding a plurality of head suspensions, variations appeared as shown in FIGS. 20 and 21. Especially, such variations are significant in a low frequency region.

Therefore, the relationship among the STA, the T1 frequency F, and the inertia I has been considered from their dimensional formula.

When the thickness of the load beam, the length thereof, and the width thereof are represented by T, L, and W, the respective dimensional formula are expressed as follows:

$$STA \propto W \times L^2 \times T^3$$

$$F \propto T/L/W$$

$$I \propto T \times L \times W^3$$

Figure 22:
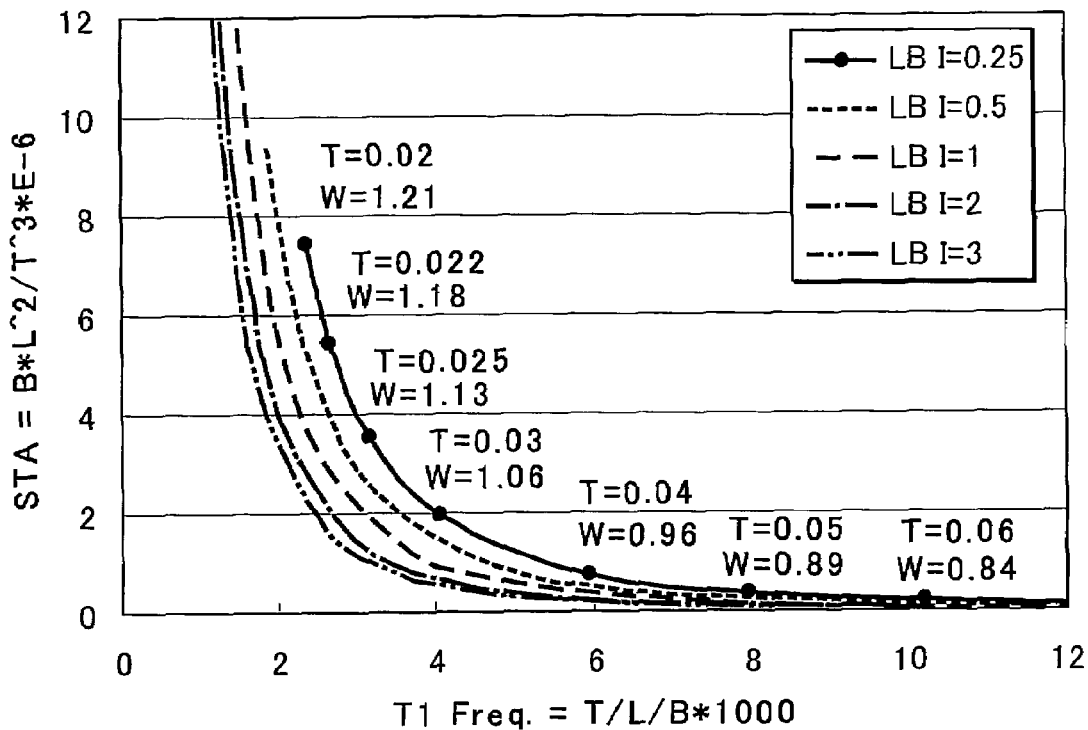
FIG. 22 is a graph showing a relationship between T1 frequency and STA.
Figure 23:
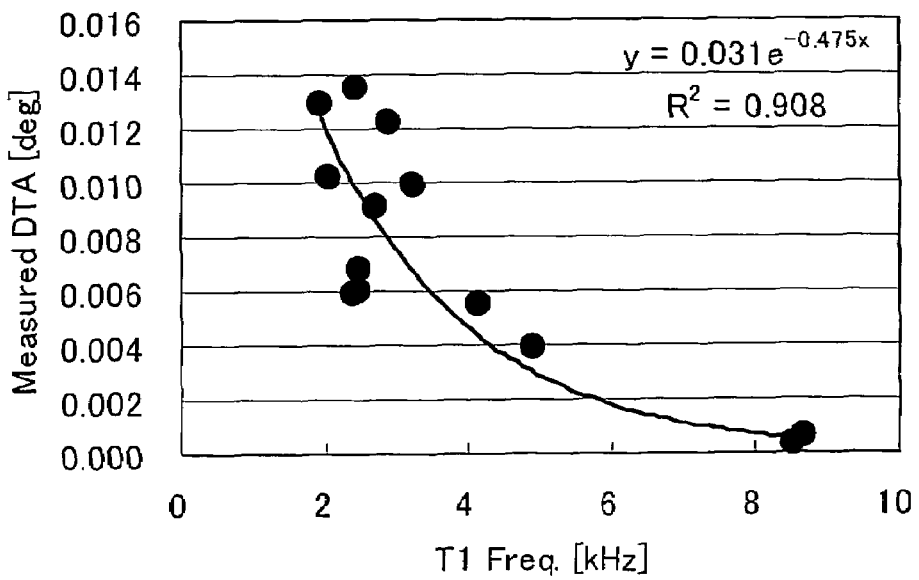
FIG. 23 is a graph showing a relationship between T1 frequency and measured DTA plotted from the value regarding a plurality of head suspensions.

FIG. 22 is a graph showing a relationship between the T1 frequency and the STA dimension where the inertia is used as a parameter. In FIG. 22, the length L of the load beam is fixed to 7 mm and the thickness T is changed from 0.02 mm to 0.1 mm. For example, by fixing the length L and the thickness T to 7 mm and 0.02 mm and utilizing the inertia as a parameter, the width W of the load beam can be calculated and the STA and the F can be calculated and plotted.

As shown in FIG. 22, when the STA is assumed as the T1 windage, a change thereof relative to the T1 frequency becomes non-linear, i.e., quadric, and the influence of the inertia is large especially in a low region of the T1 frequency. This coincides with a graph shown in FIG. 23.

As apparent from the above calculations, a thick and narrow load beam is effective to obtain high T1 frequency and small STA. That is, the thick and narrow load beam brings small inertia and high torsion rigidity. As apparent from the measured values, a load beam with the T1 frequency of 8 kHz or more is preferable.

Comparison results will be explained.

Figure 24:
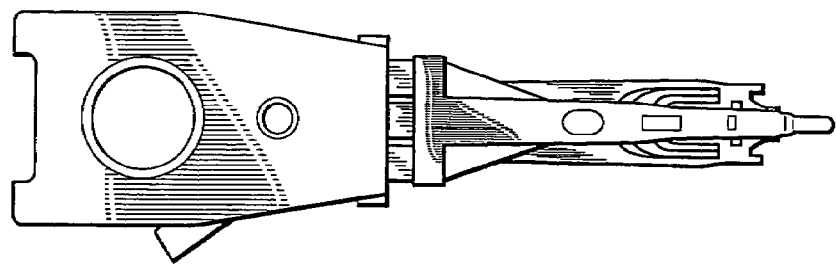
FIG. 24 is a plan view showing an example 1 of a head suspension according to the first embodiment of the present invention having a thin and narrow rigid part and a reinforcing part.
Figure 25:
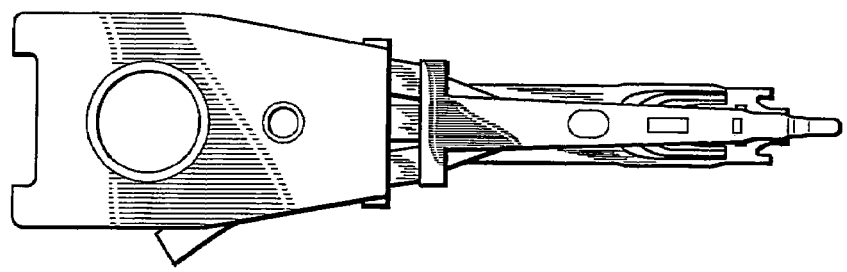
FIG. 25 is a plan view showing a comparative example 1 of a head suspension having a thin rigid part without a reinforcing part.
Figure 26:
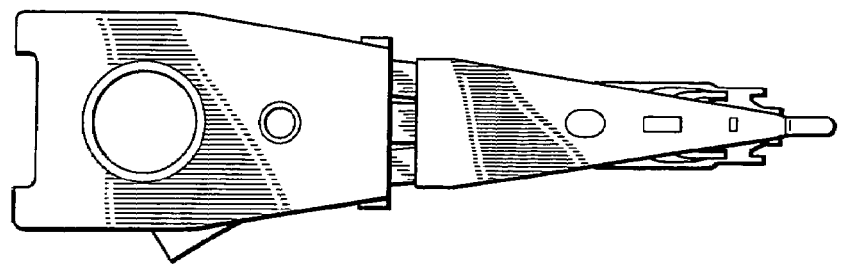
FIG. 26 is a plan view showing a comparative example 2 of a head suspension having a wide rigid part.

FIG. 24 is a plan view showing an example 1 of a head suspension according to the first embodiment of the present invention, FIG. 25 is a plan view showing a comparative example 1 of a head suspension having a narrow rigid part without reinforcing parts, and FIG. 26 is a plan view showing a comparative example 2 of a head suspension having a thick and wide rigid part. The example 1 and comparative examples 1 and 2 are compared with one another. Each of the Example and Comparative Examples is set such that its distance from a boss to a dimple is 11 mm, the length of the load beam is 6.25 mm, and the thickness thereof is 38 μm, and the thickness of the resilient part is 30 μm.

Figure 27:
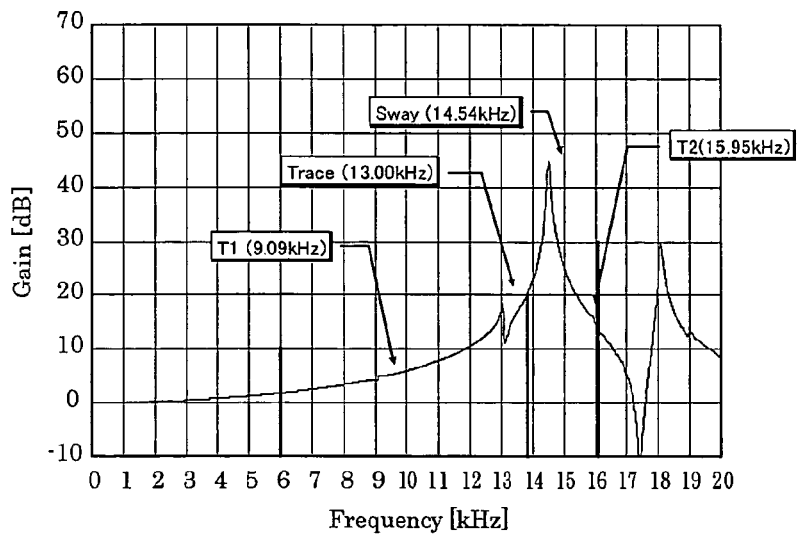
FIG. 27 is a graph showing a relationship between frequency and gain of the example of the head suspension of FIG. 24.
Figure 28:
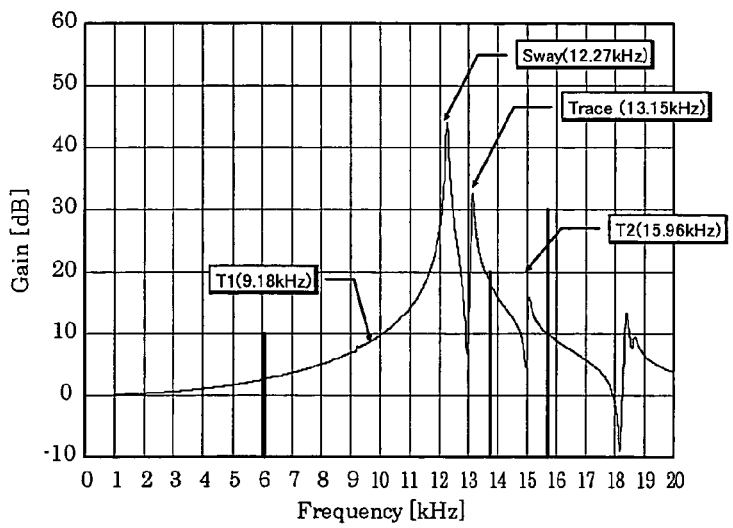
FIG. 28 is a graph showing a relationship between frequency and gain of the comparative example 1 of the head suspension of FIG. 25.
Figure 29:
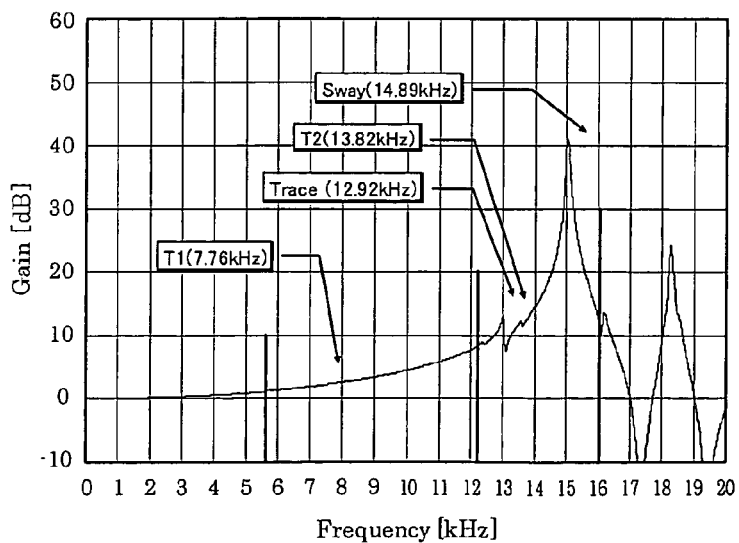
FIG. 29 is a graph showing a relationship between frequency and gain of the comparative example 2 of the head suspension of FIG. 26.

FIGS. 27 to 29 are graphs each showing relationship between a frequency and a gain, in which FIG. 27 is a result of example 1, FIG. 28 is a result of comparative example 1, and FIG. 29 is a result of comparative example 2.

Figures 30, 31, 32:
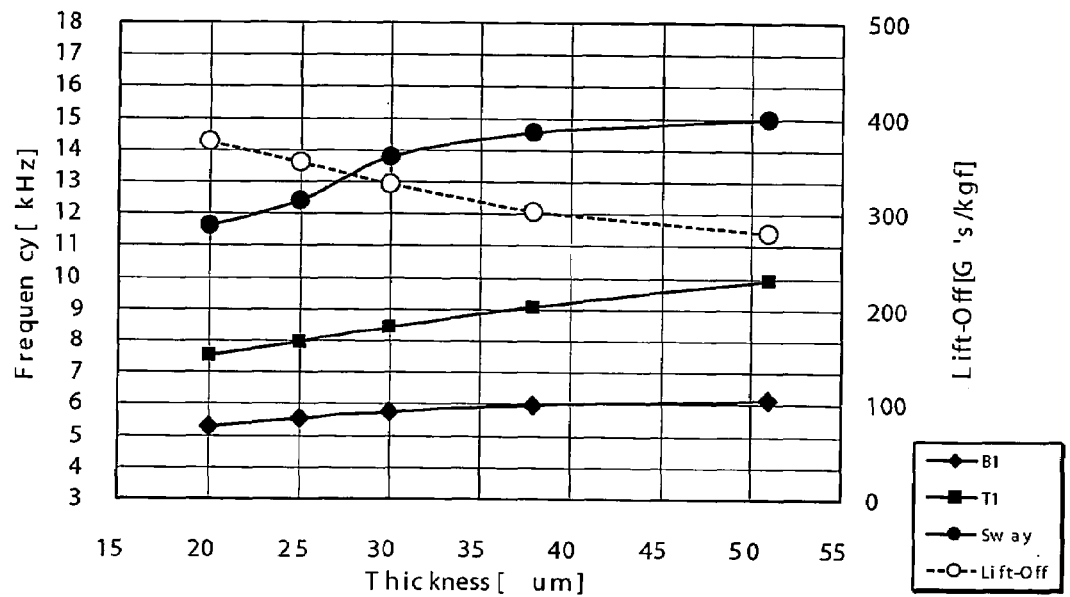
FIG. 30 is a list showing a relationship among B1 frequency, T1 frequency, sway frequency, sway rigidity, and G-lift-off the results regarding the head suspensions of example of FIG. 24, comparative Example 1 of FIG. 25, and comparative Example 2 of FIG. 26.
FIG. 31 is a graph plotted from the values obtained from head suspensions according to the first embodiment having different thicknesses.
FIG. 32 is a list based on the graph of FIG. 31.

FIG. 30 is a list showing a relationship among values of the B1 frequency, the T1 frequency, the sway frequency, the sway rigidity, and the G-lift-off regarding example 1, comparative example 1, and comparative example 2.

The B1 frequencies of example 1 and comparative example 1 are not so different from each other such that they are 5.99 kHz and 6.08 kHz, because they have high longitudinal rigidities and are light in weight. However, comparative example 2 is thick and heavy in weight, so that the B1 frequency thereof lowers to 5.61 kHz.

The T1 frequency of example 1 and comparative example 1 are not so different from each other such that they are 9.09 kHz and 9.18 kHz, because they have high longitudinal rigidities and are light in weight. However, comparative example 2 is thick and have large inertia, so that the T1 frequency thereof lowers to 7.76 kHz.

The sway frequency of example 1 and comparative example 2 are not so different from each other such that they are 14.54 kHz and 14.89 kHz, because they have high rigidities in the sway direction. On the other hand, the comparative example 1 has low rigidity in the swaying direction, so that the sway frequency thereof lowers to 12.27 kHz.

The STA of example 1 and comparative example 1 are as low as $2.31 \times 10^{-5}$ and $1.53 \times 10^{-5}$ due to the narrow rigid part, but the STA of comparative example 2 become as high as $3.23 \times 10^{-5}$ to deteriorate due to the wide rigid part.

The sway rigidity which is the lateral rigidity when the dimple is pressed of example 1 is 19920.21 N/m, comparative example 2 is 19997.62 N/m, and comparative example 1 is as low as 14502.67 N/m.

The G-lift-off of example 1 and comparative example 1 are as high as 302.38 G/gf and 311.86 G/gf due to light weight, but that of comparative example 2 is as low as 246.19 G/gf.

Thus, according to the structure of example 1 as the first embodiment of the present invention, the shock property and the T1 windage can be simultaneously improved and the T1 frequency, the B1 frequency, and the sway frequency can be made high by making the rigid part 11 narrow and light and securing the rigidity of the load beam 3.

FIG. 31 is a graph showing the result obtained from head suspensions according to the first embodiment having different thicknesses of 20, 25, 30, 38, and 51 μm, FIG. 32 is a list based on the graph of FIG. 31. In the head suspensions, a distance from the center of the boss 51 to the center of the dimple 35, the length of the load beam 3, and the thickness of the resilient part 13 are set to 11 mm, 6.25 mm, and 30 μm, respectively.

As shown in FIGS. 31 and 32, the load beam becomes heavier according to increase in thickness thereof, the G-lift-off is lowered. In this case, the B1 frequency, the T1 frequency, and the sway frequency are increased due to increase in rigidity.

In the 1-inch hard disk drive or the like, the T1 windage is disregardable, so that the G-lift-off can be improved by further thinning to reduce weight.

Such a head suspension may be also applied to a large size processing apparatus such as a desktop computer.

Second Embodiment

Figure 33:
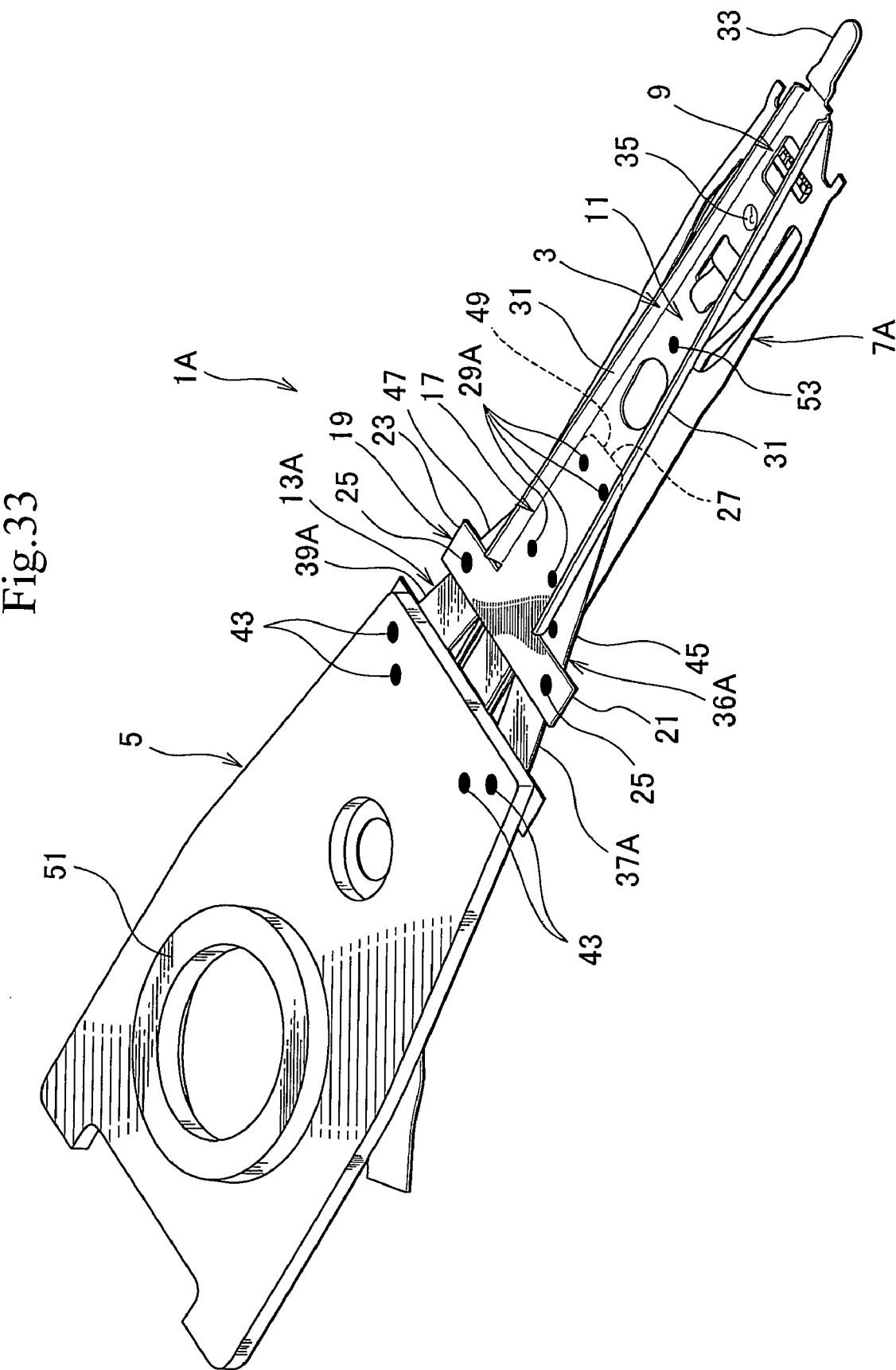
FIG. 33 is a perspective view showing a head suspension according to a second embodiment of the present invention on an opposite-to-disk side.
Figure 34:
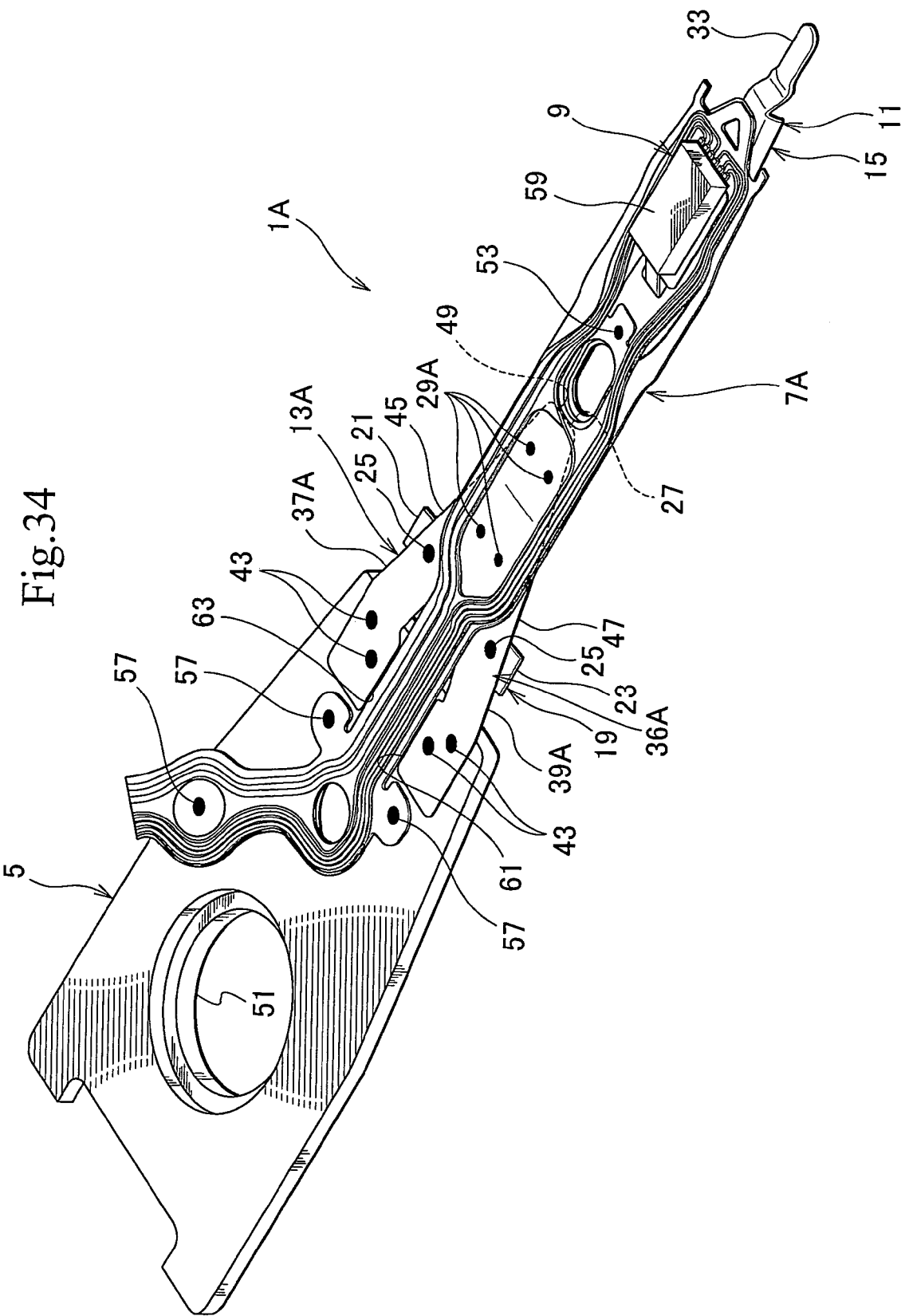
FIG. 34 is a perspective view showing the head suspension of FIG. 33 on a disk side.

FIGS. 33 and 34 show a head suspension according to a second embodiment of the present invention, in which FIG. 33 is a perspective view showing the head suspension on the opposite-to-disk side, and FIG. 34 is a perspective view thereof on the disk side. The structure of the second embodiment is basically the same as that of the first embodiment, and therefore, the same or corresponding parts are represented with the same reference numerals or the same reference numerals plus "A."

According to the head suspension 1A of the second embodiment, the resilient member 36A and a flexure 7A have shapes slightly changed from those in the first embodiment.

The resilient member 36A is provided at a second end with bifurcated branches 37A and 39A. The branches 37A and 39A have inner side edges 61 and 63 opposite to each other in the across-the-width direction of the load beam 3, respectively. The inner side edges 61 and 63 of the branches 37A and 39A protrude toward the flexure 7A in the across-the-width direction.

The flexure 7A is welded by welded spots 29A between the rigid part 11 and the extension 27.

According to the second embodiment, reinforcing parts 45 and 47 are provided on the extension 27 of the resilient member 36A, so that approximately similar function and advantage to those of the first embodiment can be achieved.

Additionally, the flexure 7A can be reliably fixed to the resilient member 36A via the extension 27, so that it can securely prevent the flexure 7A from fluttering.

Third Embodiment

Figure 35:
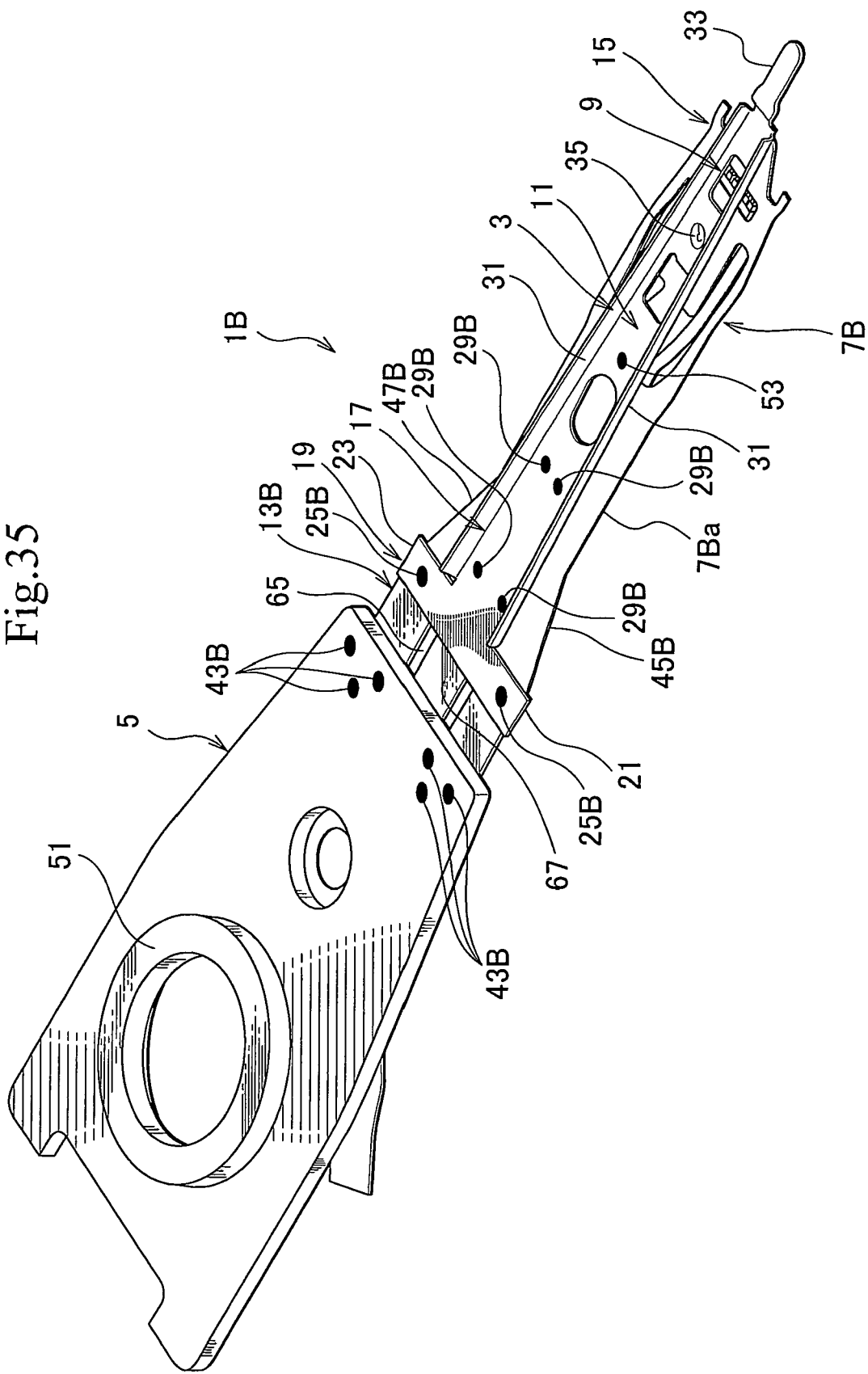
FIG. 35 is a perspective view showing a head suspension according to a third embodiment of the present invention on an opposite-to-disk side.
Figure 36:
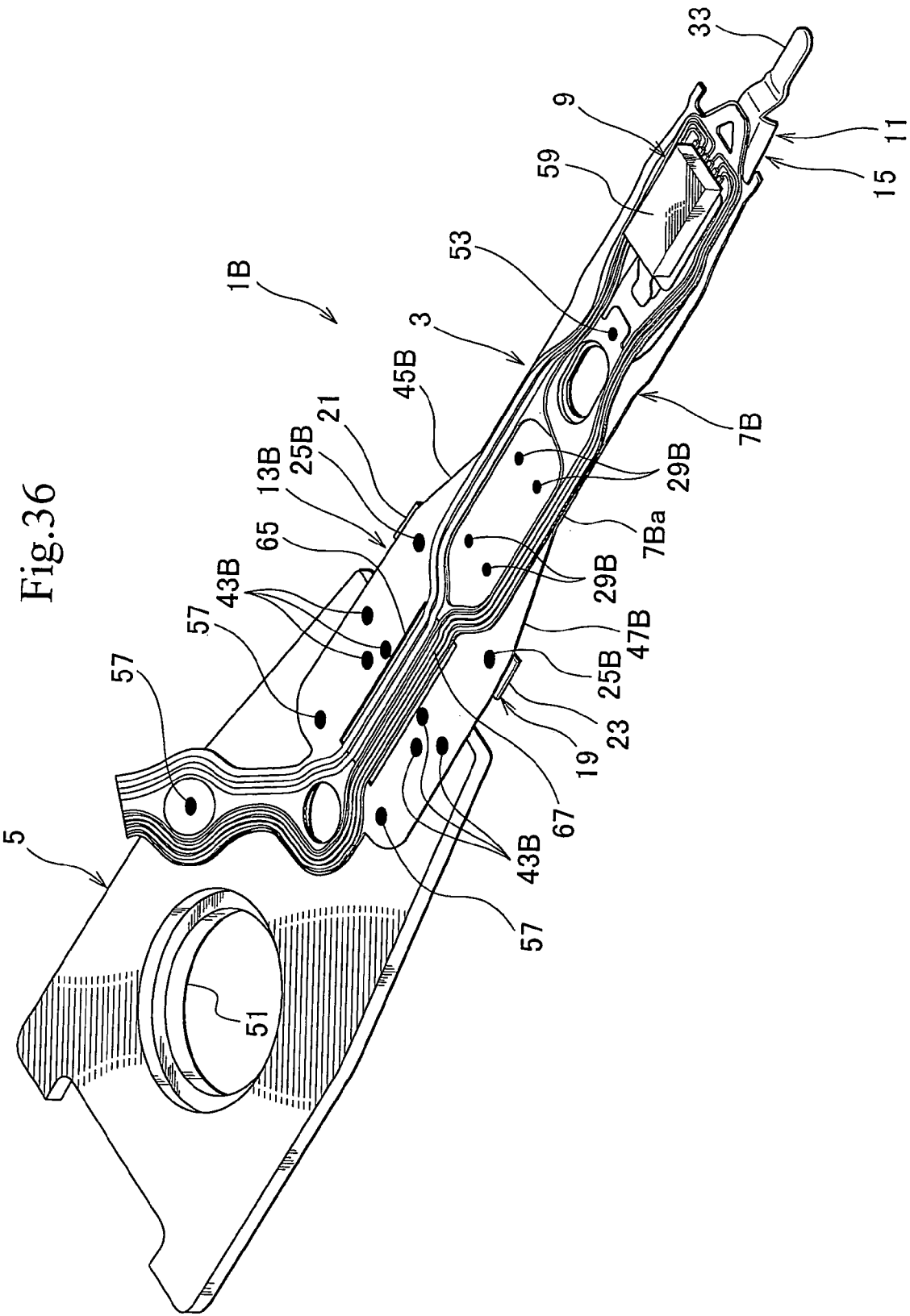
FIG. 36 is a perspective view showing the head suspension of FIG. 35 on a disk side.
Figure 37:
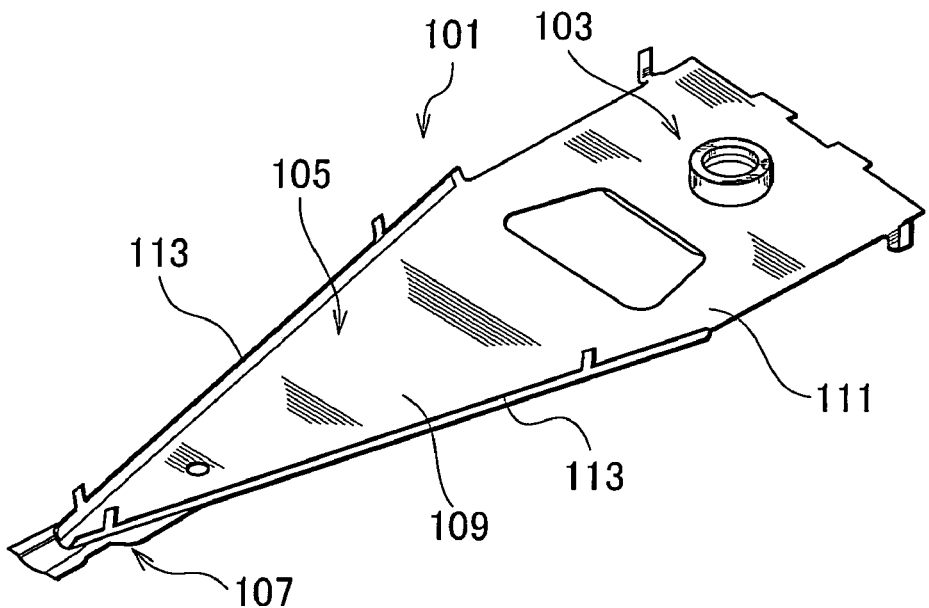
FIG. 37 is a plan view showing a head suspension according to a related art.

FIGS. 35 and 36 show a head suspension according to a third embodiment of the present invention, in which FIG. 35 is a perspective view showing the head suspension on the opposite-to-disk side, and FIG. 36 is a perspective view thereof on a disk side. The structure of the third embodiment is basically the same as that of the first embodiment, and therefore, the same or corresponding parts are represented with the same reference numerals or the same reference numerals plus "B."

According to the head suspension 1B of the third embodiment, a resilient part 13B is integrated with a thin plate 7Ba made of, for example, a thin stainless steel rolled plate (SST) having a spring or resilient property of the flexure 7B. Namely, the resilient part 13B is formed on both sides defined by a hole 65 formed in the thin plate 7Ba. The hole 65 is arranged under and in correspondence with read/write wiring patterns 67 including an insulating layer. Therefore, the hole 65 substantially has the same width as the wiring patterns 67 and its length extends from a portion positioned on the base plate 5 to a portion positioned on the joint 19. Reinforcing parts 45B and 47B is also integrated with the thin plate 7Ba. According to the third embodiment, the reinforcing parts 45B and 47B have a trapezoidal wing shape instead of the triangular wing shape of the reinforcing parts 45 and 47 of the first embodiment. The flexure 7B is welded to the joint 19 of the rigid part 11 at welded spots 25B, is welded to the rigid part 11 at welded spots 29B, is welded to the base plate 5 at welded spot 43B, and is welded at other portions similarly.

According to the third embodiment, functions and advantages similar to those in the first embodiment can be achieved due to the reinforcing parts 45B and 47B. In addition, the resilient part 13B and the reinforcing parts 45B and 47B are integrated with the flexure 7B. Therefore, the number of parts is considerably reduced, and parts assembling and parts management are remarkably made easy.

According to the present invention, the reinforcing part may be formed from a rod-like bridge instead of a wing shape bridge of the reinforcing parts 45 or 45B and 47 or 47B wholly filling spaces between each protrusion of the joint and the rigid part.

The shapes and sizes of the reinforcing parts 45, 45B, 47, and 47B, and the extension 27 may be set optionally to be reduced or expanded, unless such a requirement as weight reduction is injured.

In the first and second embodiments, the reinforcing parts 45 and 47 are formed on both sides of the extension 27 of the resilient member 36 or 36A. Instead, since the present invention only has to provide the reinforcing parts 45 and 47 to accomplish the object thereof, the extension 27 may be removed.

Rails obtained by box bending may be provided on outer side edges of the reinforcing parts 45 and 47. This may raise the longitudinal rigidity and lateral rigidity of the extension 27, the T1 frequency, the B1 frequency, and the sway frequency to allow further thinning of the extension 27. In this case, an outer face of a corner between the rail and each reinforcing part may be formed from a curved face, so that teeth of a comb jig used when a plurality of head suspensions are simultaneously assembled may be easily inserted in between head suspensions utilizing the outer face as a guide.

The reinforcing parts 45 and 47 may be separated from the resilient member 36 or 36A, and the reinforcing parts 45B and 47B may be separated from the flexure 7B.

The rails 31 of the rigid part 11 may be omitted therefrom if a sufficient longitudinal rigidity of the rigid part 11 is secured.

What is claimed is:

1. A head suspension for a hard disk drive, comprising:
   a base to be attached to a carriage of the hard disk drive and turned around a spindle;
   a load beam including a rigid part and a resilient part non-integral to the rigid part, the load beam extending longitudinally from the base to apply load onto a head to write and read data to and from a disk arranged in the hard disk drive;
   the rigid part having a base end, a front end distal to the base end, a longitudinal direction extending from the base end to the front end, a middle portion between the base end and the front end, and side edges opposing one another in a lateral direction of the rigid part extending from the front end to the base end and along the middle portion, and the base end including a joint portion connected to the resilient part;
   the resilient part being supported on the base;
   a flexure having read/write wiring patterns connected to the head, the flexure supporting the head at the front end of the rigid part and the flexure being attached to the rigid part of the load beam;
   the rigid part having protrusions at the joint portion extending laterally outward of each of the side edges; and
   reinforcing parts each protruding laterally outwardly from respective ones of the side edges of the rigid part and interconnecting the side edges to respective ones of the protrusions so as to bridge a gap between the protrusions and the side edges, the reinforcing parts having forward ends connected to the side edges at the middle portion of the rigid part, and expanding in width in the lateral direction with increasing distance from the forward ends toward the protrusions.

2. The head suspension of claim 1, wherein:
   the resilient part includes a resilient member non-integral to the rigid part, and
   the reinforcing parts are part of the resilient member.

3. The head suspension of claim 2, wherein:
   the resilient member is provided with an extension extending toward the front end of the rigid part,
   the reinforcing parts are provided on both sides of the extension.

4. The head suspension of claim 3, wherein a length of the reinforcing parts is set in a range of ¼ to ½ of a length of the rigid part.

5. The head suspension of claim 1, wherein:
   the resilient part is formed from apart of the flexure, and
   the reinforcing parts are provided on the flexure.

6. The head suspension of claim 1, wherein the reinforcing parts are formed in a delta wing shape having the width gradually increase with decreasing distance to the joint portion.

7. The head suspension of claim 2, wherein the reinforcing parts are formed in a delta wing shape having the width gradually increase with decreasing distance to the joint portion.

8. The head suspension of claim 3, wherein the reinforcing parts are formed in a delta wing shape having the width gradually increase with decreasing distance to the joint portion.

9. The head suspension of claim 4, wherein the reinforcing parts are formed in a delta wing shape having the width gradually increase with decreasing distance to the joint portion.

10. The head suspension claim 5, wherein the reinforcing parts are formed in a delta wing shape having the width gradually increase with decreasing distance to the joint portion.

11. The head suspension of claim 1, further comprising rails extending from the front end of the rigid part to a portion just before the joint portion along both the side edges of the rigid part.

12. The head suspension of claim 2, further comprising rails extending from the front end of the rigid part to a portion just before the joint portion along both the side edges of the rigid part.

13. The head suspension of claim 3, further comprising rails extending from the front end of the rigid part to a portion just before the joint portion along both the side edges of the rigid part.

14. The head suspension of claim 4, further comprising rails extending from the front end of the rigid part to a portion just before the joint portion along both the side edges of the rigid part.

15. The head suspension claim 5, further comprising rails extending from the front end of the rigid part to a portion just before the joint portion along both the side edges of the rigid part.

16. The head suspension of claim 6, further comprising rails extending from the front end of the rigid part to a portion just before the joint portion along both the side edges of the rigid part.

17. The head suspension claim 7, further comprising rails extending from the front end of the rigid part to a portion just before the joint portion along both the side edges of the rigid part.

18. The head suspension of claim 8, further comprising rails extending from the front end of rigid part to a portion just before the joint portion along both the side edges of the rigid part.

19. The head suspension of claim 9, further comprising rails extending from the front end of the rigid part to a portion just before the joint portion along both the side edges of the rigid part.

20. The head suspension of claim 10, further comprising rails extending from the front end of the rigid part to a portion just before the joint portion along both the side edges of the rigid part.

21. The head suspension of claim 1, wherein the resilient part comprises a resilient member non-integral to the rigid part and which integrally having branches disposed between and connected in the joint portion of the rigid part and the base, an extension portion overlapping and connected to the middle portion of the rigid part, and the reinforcing parts extending laterally outward from the extension portion.

22. The head suspension of claim 1, wherein the rigid part comprises the protrusions to form a T-shape.

23. A head suspension for a hard disk drive, comprising:
a base to be attached to a carriage of the hard disk drive and turned around a spindle;
a load beam including a rigid part and a resilient part non-integral to the rigid part;
the rigid part having a base end, a front end distal to the base end, a longitudinal direction extending from the base end to the front end, a joint portion at the base end, and a narrow main body extending from the joint portion to the front end, and the narrow main body being narrower than the joint portion and having rigid part side edges on opposing sides in a lateral direction thereof;
the joint portion including protrusions protruding laterally outward of both the side edges of the narrow main body and having protrusion front edges extending substantially orthogonal to the rigid part side edges of the narrow main body so as to form substantially a T-shape in conjunction with the narrow main body;
a resilient part, non-integral to the rigid part and thinner than the rigid part, having a first end connected to the base, a mid portion connected to the joint portion at the protrusions, and an extension portion extending from the mid portion toward the front end of the rigid part, the extension portion being connected to the narrow main body and having reinforcing parts extending laterally outward of the narrow main body and interconnecting the protrusions with the narrow main body via bridging gaps between the protrusion front edges and the rigid part side edges of the narrow main body;
a flexure, connected to the narrow main body of the rigid part and extending along the narrow main body to the front end whereat a head is connected to wiring patterns on the flexure and supported by the flexure; and
the reinforcing parts having forward ends and extending backward from the forward ends toward the protrusion front edges while increasing in width in the lateral direction with decreasing distance to the protrusion front edges.

24. The head suspension of claim 23 wherein the reinforcing parts have a length from the protrusions to the forward ends which is ¼ to ½ a length of the rigid part.

25. The head suspension of claim 23 further comprising rails provided along the side edges of the narrow main body beginning at points forward of the joint portion, and the reinforcing parts extending laterally outward from the rails.

26. The head suspension of claim 23 wherein the flexure is non-integral to the resilient part and lies on the extension of the resilient part such that the extension is layered between the narrow main body and the flexure.

27. The head suspension of claim 23 wherein the flexure is integral to the resilient part.

28. The head suspension for a hard disk drive according to claim 23, further comprising:
rails extending from the front end of the rigid part to proximate the joint portion along both the side edges of the rigid part;
the reinforcing parts each protruding laterally outward from the rails on each of the sides; and
the reinforcing parts having a length from the protrusions to the forward ends which is ¼ to ½ a length of the rigid part.

29. The head suspension for a hard disk drive according to claim 28, wherein the length of the reinforcing parts is greater than a width of the reinforcing parts at the protrusions.

30. The head suspension for a hard disk drive according to claim 1, further comprising:
rails extending from the front end of the rigid to proximate the protrusions along both the side edges of the rigid part;
the reinforcing parts each protruding laterally outward from the rails on each of the side edges; and
the reinforcing parts having the length from the protrusions to the forwards ends which is ¼ to ½ a length of the rigid part.

31. The head suspensions for a hard disk drive according to claim 30, wherein the length of the reinforcing parts is greater than a width of the reinforcing parts at the protrusions.

* * * * *